US009019653B2

(12) United States Patent
Biskeborn et al.

(10) Patent No.: US 9,019,653 B2
(45) Date of Patent: Apr. 28, 2015

(54) HIGH DENSITY TIMING BASED SERVO FORMAT FOR USE WITH TILTED TRANSDUCER ARRAYS

(71) Applicant: International Business Machines Corporation, Armonk, NY (US)

(72) Inventors: Robert G. Biskeborn, Hollister, CA (US); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/964,643

(22) Filed: Aug. 12, 2013

(65) Prior Publication Data

US 2015/0043101 A1     Feb. 12, 2015

(51) Int. Cl.
    *G11B 5/584*     (2006.01)
    *G11B 5/68*     (2006.01)

(52) U.S. Cl.
    CPC ........................................ *G11B 5/68* (2013.01)

(58) Field of Classification Search
None
See application file for complete search history.

(56) References Cited

U.S. PATENT DOCUMENTS

| 7,095,583 | B2 * | 8/2006 | Johnson et al. | ............ | 360/77.12 |
| 7,538,969 | B2 | 5/2009 | Weber et al. | | |
| 7,684,143 | B2 | 3/2010 | Jaquette | | |
| 7,724,466 | B2 | 5/2010 | Bui et al. | | |
| 7,764,460 | B2 | 7/2010 | Bates et al. | | |
| 7,832,084 | B2 * | 11/2010 | Dugas et al. | ............... | 29/603.07 |
| 7,876,521 | B2 | 1/2011 | Cherubini et al. | | |
| 8,089,716 | B2 | 1/2012 | Takayama et al. | | |
| 8,902,537 | B1 | 12/2014 | Biskeborn et al. | | |
| 2003/0123181 | A1 * | 7/2003 | Hennecken et al. | ....... | 360/77.13 |
| 2008/0144211 | A1 * | 6/2008 | Weber et al. | ................ | 360/77.12 |
| 2011/0051283 | A1 | 3/2011 | Harper et al. | | |
| 2012/0050909 | A1 | 3/2012 | Lantz et al. | | |

OTHER PUBLICATIONS

"Timing-Based-Slope Measurement for M-Pattern Timing-Based-Servo," IBM, May 11, 2007, IPCOM000152774D, pp. 1-3.
Han et al., "Evaluation of Track Following Servo Performance for Patterned Servo Sectors in Hard Disk Drives," 2009 IEEE, Joint 48th IEEE Conference on Decision and Control and 28th Chinese Control Conference, Dec. 16-18, 2009, pp. 7539-7544.
Lantz et al., "Servo-Pattern Design and Track-Following Control for Nanometer Head Positioning on Flexible Tape Media," 2011 IEEE, IEEE Transactions on Control Systems Technology, vol. 20,No. 2, Mar. 2012, pp. 369-381.
Non-Final Office Action from U.S. Appl. No. 13/964,614 dated Mar. 21, 2014.
Notice of Allowance and Fee(s) Due from U.S. Appl. No. 13/964,614 dated Jul. 23, 2014.

* cited by examiner

*Primary Examiner* — Paul Huber
(74) *Attorney, Agent, or Firm* — Zilka-Kotab, PC

(57) ABSTRACT

A product, according to one embodiment, includes a magnetic recording tape having opposite ends, a longitudinal axis of the magnetic recording tape being defined between the ends. The magnetic recording tape has at least one servo track, the at least one servo track having a plurality of first magnetic bars and a plurality of third magnetic bars oriented to form chevron-like patterns with the first magnetic bars. The first magnetic bars each have a longitudinal axis oriented at a first angle between 2 and 88 degrees from the longitudinal axis of the magnetic recording tape. The third magnetic bars each have a longitudinal axis oriented at a second angle between 2 and 88 degrees from the longitudinal axis of the magnetic recording tape, the second angle having a different numerical absolute value than the first angle.

19 Claims, 16 Drawing Sheets

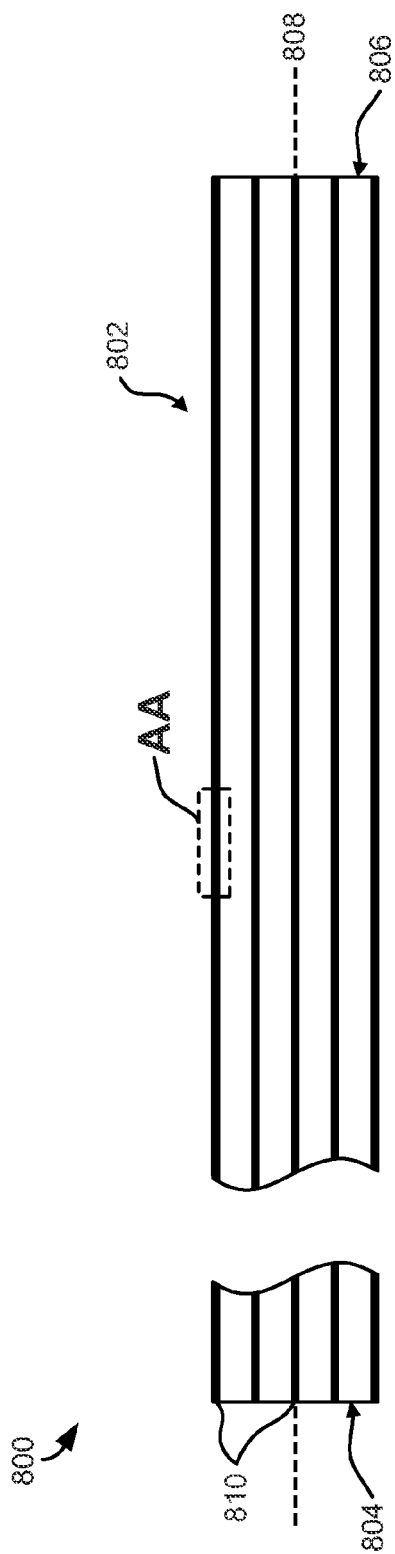
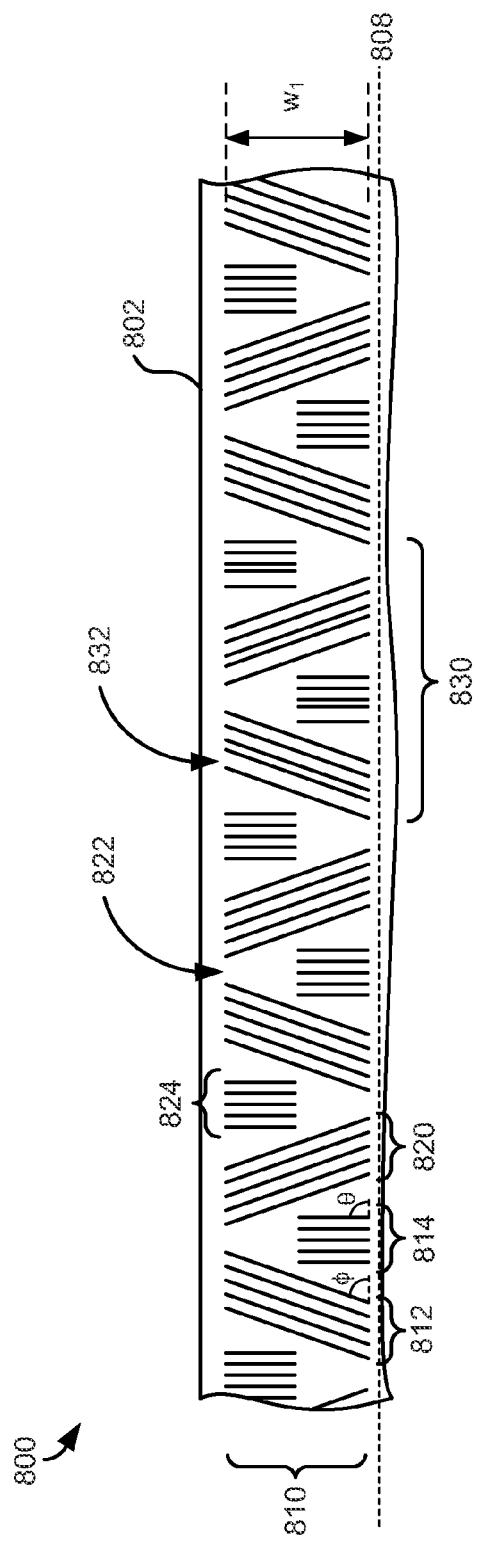
FIG. 8A
FIG. 8B

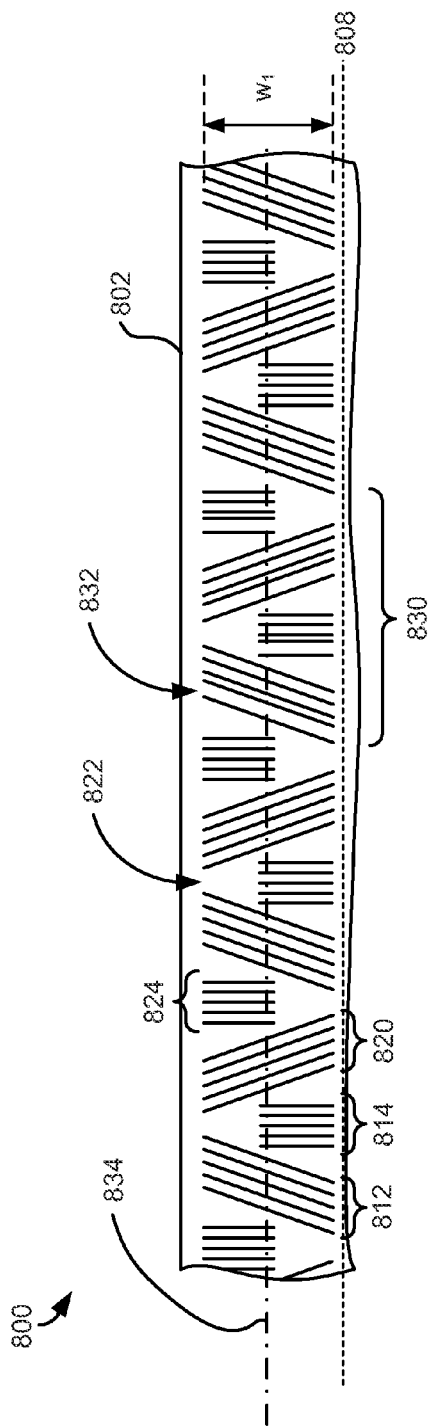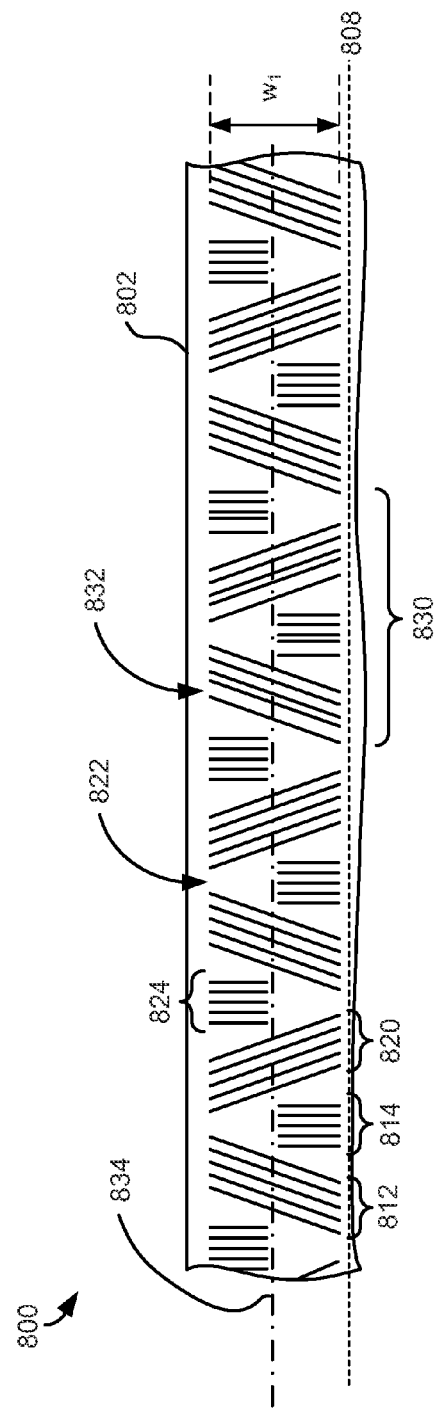

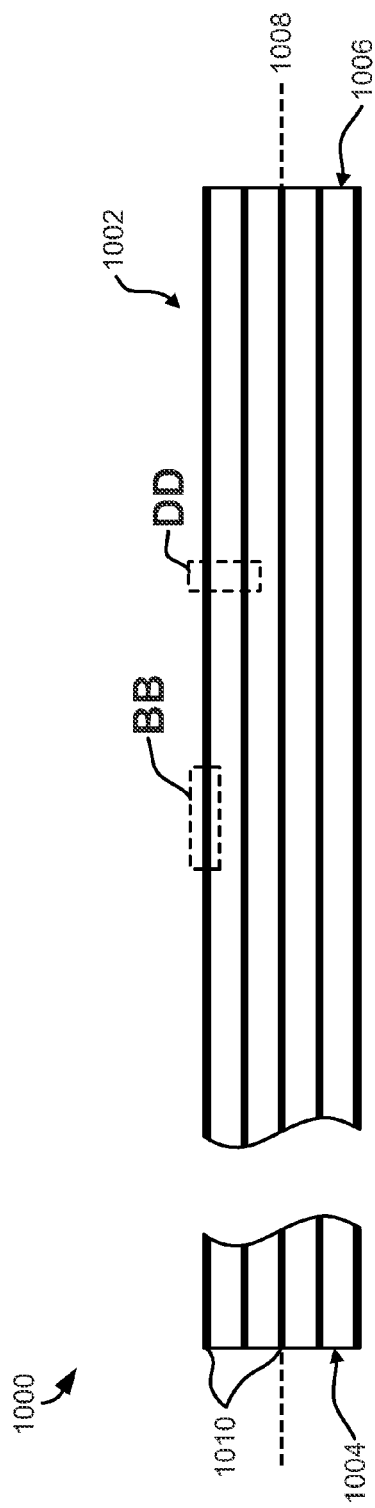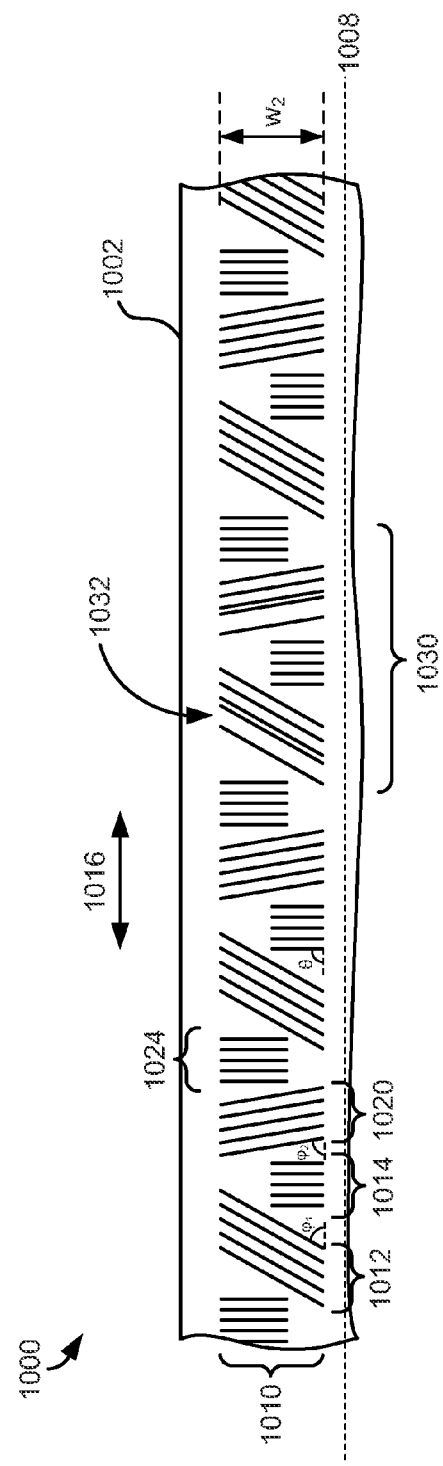
FIG. 10A
FIG. 10B

1100

1102 — Reading at least two servo tracks on a magnetic recording tape, the servo tracks each having a plurality of first magnetic bars, a plurality of second magnetic bars, and a plurality of third magnetic bars oriented to form chevron-like patterns with the first magnetic bars, the second magnetic bars being positioned between sets of the first and third magnetic bars in a servo frame, the first magnetic bars each having a longitudinal axis oriented between 2 and 88 degrees from the longitudinal axis of the magnetic recording tape, the third magnetic bars each having a longitudinal axis oriented at a second angle between 2 and 88 degrees from the longitudinal axis of the magnetic recording tape, the second angle having a different numerical absolute value than the first angle.

1104 — Determining a timing offset between detection of the second magnetic bars of the servo tracks.

1106 — Calculating a skew based on the timing offset.

FIG. 11

HIGH DENSITY TIMING BASED SERVO FORMAT FOR USE WITH TILTED TRANSDUCER ARRAYS

BACKGROUND

The present invention relates to data storage systems, and more particularly, this invention relates to a high density timing based servo format, a tape having said servo format, and related apparatuses compatible therewith.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be increased by increasing the number of data tracks across the tape. More tracks are added typically by a process known as shingled writing, where the write head is positioned to partially overlap the previously written tracks. More tracks are made possible by reducing feature sizes of the readers and writers, such as by using thin-film fabrication techniques and magnetoresistive (MR) sensors, by improving tracking accuracy, etc. However, for various reasons, the feature sizes of readers and writers cannot be arbitrarily reduced; accordingly factors such as lateral tape motion transients and tape lateral expansion and contraction (e.g., perpendicular to the direction of tape travel) must be balanced with reader/writer sizes that provide acceptable written tracks and readback signals. Tracking accuracy is limited by the track-following actuator characteristics, and as importantly, by the design of the servo pattern itself. One issue limiting areal density is misregistration caused by tape lateral expansion and contraction. Tape width can vary by up to about 0.1% due to expansion and contraction caused by changes in humidity, tape tension, temperature, aging etc. This is often referred to as tape dimensional stability (TDS), or more properly, tape dimensional instability (TDI).

If the tape is written in one environment and then read back in another, the TDI may prevent the spacing of the tracks on the tape from precisely matching the spacing of the reading elements during readback. In current products, the change in track spacing due to TDI is small compared to the size of the written tracks and is part of the tracking budget that is considered when designing a product. As the tape capacity increases over time, tracks are becoming smaller and TDI is becoming an increasingly larger portion of the tracking budget and this is a limiting factor for growing areal density.

BRIEF SUMMARY

A product, according to one embodiment, includes a magnetic recording tape having opposite ends, a longitudinal axis of the magnetic recording tape being defined between the ends. The magnetic recording tape has at least one servo track, the at least one servo track having a plurality of first magnetic bars and a plurality of third magnetic bars oriented to form chevron-like patterns with the first magnetic bars. The first magnetic bars each have a longitudinal axis oriented at a first angle between 2 and 88 degrees from the longitudinal axis of the magnetic recording tape. The third magnetic bars each have a longitudinal axis oriented at a second angle between 2 and 88 degrees from the longitudinal axis of the magnetic recording tape, the second angle having a different numerical absolute value than the first angle.

An apparatus, according to one embodiment, includes a magnetic head; a drive mechanism for passing the magnetic recording tape as described above over the magnetic head; and a controller electrically coupled to the magnetic head is configured to position the magnetic head based on signals derived from the at least one servo track on the magnetic recording tape.

An apparatus, according to another embodiment, includes a magnetic head having at least one servo writer for writing the magnetic bars to the magnetic recording tape as described above; a drive mechanism for passing the magnetic recording tape over the magnetic head; and a controller electrically coupled to the magnetic head.

A method for detecting skew, according to one embodiment, includes reading at least two servo tracks on a magnetic recording tape, the servo tracks each having a plurality of first magnetic bars, at least a plurality of second magnetic bars, and a plurality of third magnetic bars oriented to form chevron-like patterns with the first magnetic bars, the second magnetic bars being positioned between sets of the first and third magnetic bars in a servo frame, the first magnetic bars each having a longitudinal axis oriented a first angle between 2 and 88 degrees from the longitudinal axis of the magnetic recording tape, the third magnetic bars each having a longitudinal axis oriented at a second angle between 2 and 88 degrees from the longitudinal axis of the magnetic recording tape, the second angle having a different numerical absolute value than the first angle, wherein the second magnetic bars each have a longitudinal axis oriented substantially 90 degrees from the longitudinal axis of the magnetic recording tape. The method also includes determining a timing offset between detection of the second magnetic bars of the servo tracks; and calculating a skew based on the timing offset.

An apparatus according to yet another embodiment includes a magnetic head; a drive mechanism for passing a magnetic recording tape over the magnetic head; and a controller electrically coupled to the magnetic head. The controller is configured to receive signals from the magnetic head as it reads at least two servo tracks on a magnetic recording tape, the servo tracks each having a plurality of first magnetic bars, a plurality of second magnetic bars, and a plurality of third magnetic bars oriented to form chevron-like patterns with the first magnetic bars, the second magnetic bars being positioned between sets of the first and third magnetic bars in a servo frame, the first magnetic bars each having a longitudinal axis oriented a first angle between 2 and 88 degrees from the longitudinal axis of the magnetic recording tape, the third magnetic bars each having a longitudinal axis oriented at a second angle between 2 and 88 degrees from the longitudinal axis of the magnetic recording tape, the second angle having a different numerical absolute value than the first angle; determine a timing offset between detection of the second magnetic bars of the servo tracks; and calculate a skew based on the timing offset.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 8A is a partial side representational view of a magnetic recording tape according to one embodiment.

FIG. 8B is a detail representational view of the magnetic recording tape taken from box AA of FIG. 8A, according to one embodiment.

FIG. 8C is a detail representational view of an alternate embodiment of the magnetic recording tape of FIG. 8B.

FIG. 8D is a detail representational view of an alternate embodiment of the magnetic recording tape of FIG. 8B.

FIG. 10A is a partial side representational view of a magnetic recording tape according to one embodiment.

FIG. 10B is a detail representational view of the magnetic recording tape taken from box BB of FIG. 10A, according to one embodiment.

FIG. 11 is a flowchart of the process steps for a method, according to one embodiment.

DETAILED DESCRIPTION

Figure 1A:
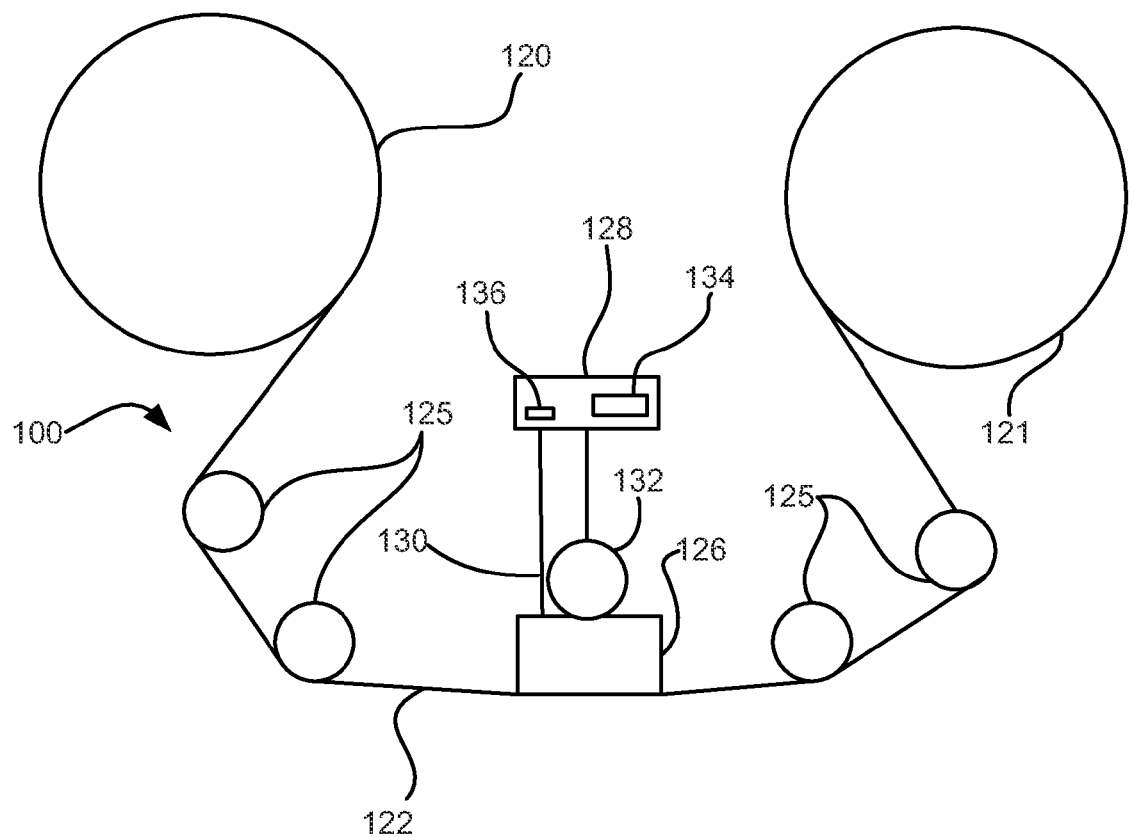
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments described herein include servo tracks having magnetic bars compatible with nominally rotated magnetic heads, e.g., to compensate for shifted data tracks, as will be discussed in further detail below.

In one general embodiment, a product includes a magnetic recording tape having opposite ends, a longitudinal axis of the magnetic recording tape being defined between the ends. The magnetic recording tape has at least one servo track, the at least one servo track having a plurality of first magnetic bars and a plurality of third magnetic bars oriented to form chevron-like patterns with the first magnetic bars. The first magnetic bars each have a longitudinal axis oriented at a first angle between 2 and 88 degrees from the longitudinal axis of the magnetic recording tape. The third magnetic bars each have a longitudinal axis oriented at a second angle between 2 and 88 degrees from the longitudinal axis of the magnetic recording tape, the second angle having a different numerical absolute value than the first angle.

In another general embodiment, an apparatus includes a magnetic head; a drive mechanism for passing the magnetic recording tape as described above over the magnetic head; and a controller electrically coupled to the magnetic head is configured to position the magnetic head based on signals derived from the at least one servo track on the magnetic recording tape.

In yet another general embodiment, an apparatus includes a magnetic head having at least one servo writer for writing the magnetic bars to the magnetic recording tape as described above; a drive mechanism for passing the magnetic recording tape over the magnetic head; and a controller electrically coupled to the magnetic head.

In a further general embodiment, a method for detecting skew includes reading at least two servo tracks on a magnetic recording tape, the servo tracks each having a plurality of first magnetic bars, at least a plurality of second magnetic bars, and a plurality of third magnetic bars oriented to form chevron-like patterns with the first magnetic bars, the second magnetic bars being positioned between sets of the first and third magnetic bars in a servo frame, the first magnetic bars each having a longitudinal axis oriented a first angle between 2 and 88 degrees from the longitudinal axis of the magnetic recording tape, the third magnetic bars each having a longitudinal axis oriented at a second angle between 2 and 88 degrees from the longitudinal axis of the magnetic recording tape, the second angle having a different numerical absolute value than the first angle, wherein the second magnetic bars each have a longitudinal axis oriented substantially 90 degrees from the longitudinal axis of the magnetic recording tape. The method also includes determining a timing offset between detection of the second magnetic bars of the servo tracks; and calculating a skew based on the timing offset.

In yet another general embodiment, an apparatus includes a magnetic head; a drive mechanism for passing a magnetic recording tape over the magnetic head; and a controller electrically coupled to the magnetic head. The controller is configured to receive signals from the magnetic head as it reads at least two servo tracks on a magnetic recording tape, the servo tracks each having a plurality of first magnetic bars, a plurality of second magnetic bars, and a plurality of third magnetic bars oriented to form chevron-like patterns with the first magnetic bars, the second magnetic bars being positioned between sets of the first and third magnetic bars in a servo frame, the first magnetic bars each having a longitudinal axis oriented a first angle between 2 and 88 degrees from the longitudinal axis of the magnetic recording tape, the third magnetic bars each having a longitudinal axis oriented at a second angle between 2 and 88 degrees from the longitudinal axis of the magnetic recording tape, the second angle having a different numerical absolute value than the first angle; determine a timing offset between detection of the second magnetic bars of the servo tracks; and calculate a skew based on the timing offset.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
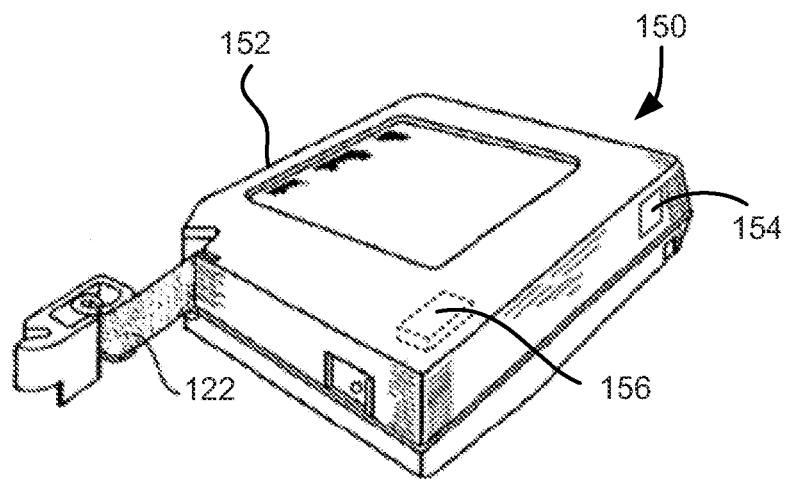
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
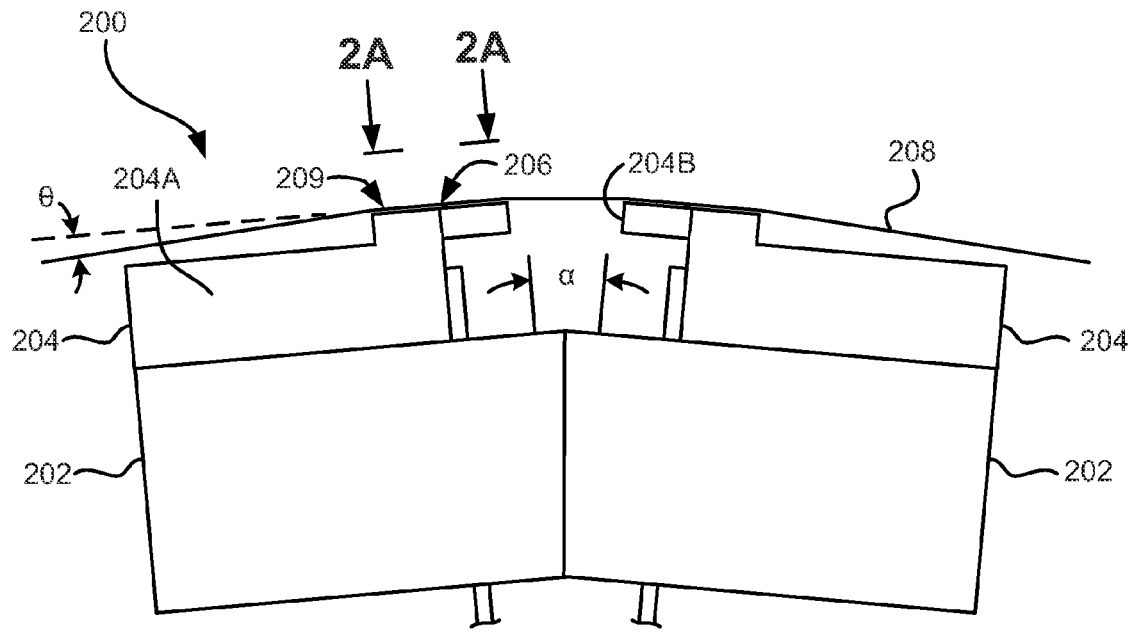
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
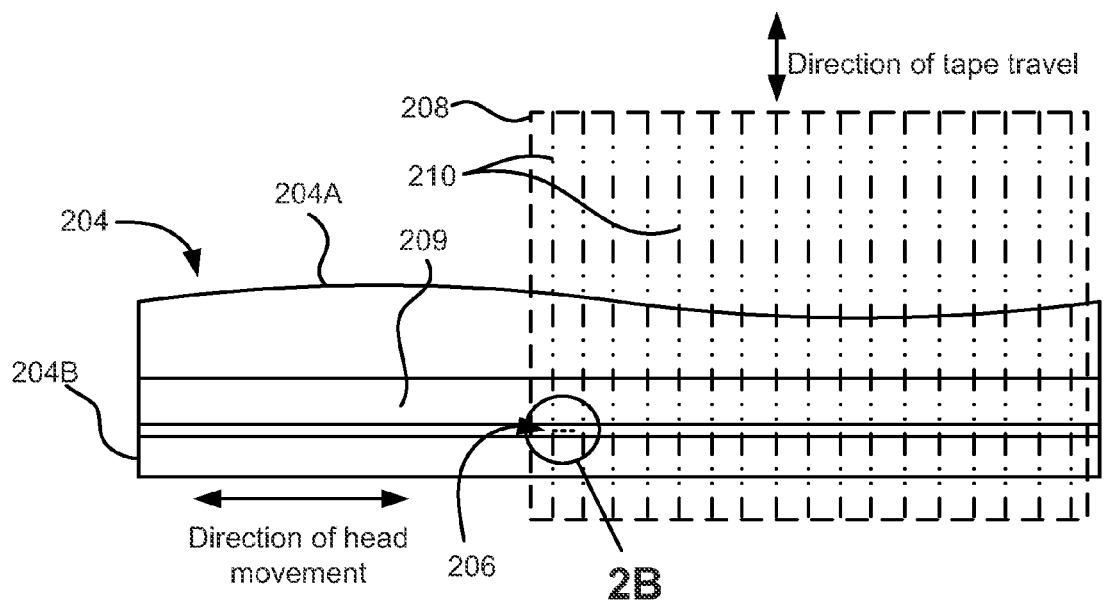
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

The servo tracks 210 also preferably include magnetic bars, e.g., see FIG. 8. As an option, the magnetic bars may provide a magnetic head with run-time information, which may include, but is not limited to speed of the tape, longitudinal and/or cross track positioning along the tape, etc. as will be discussed in further detail below.

Figure 2B:
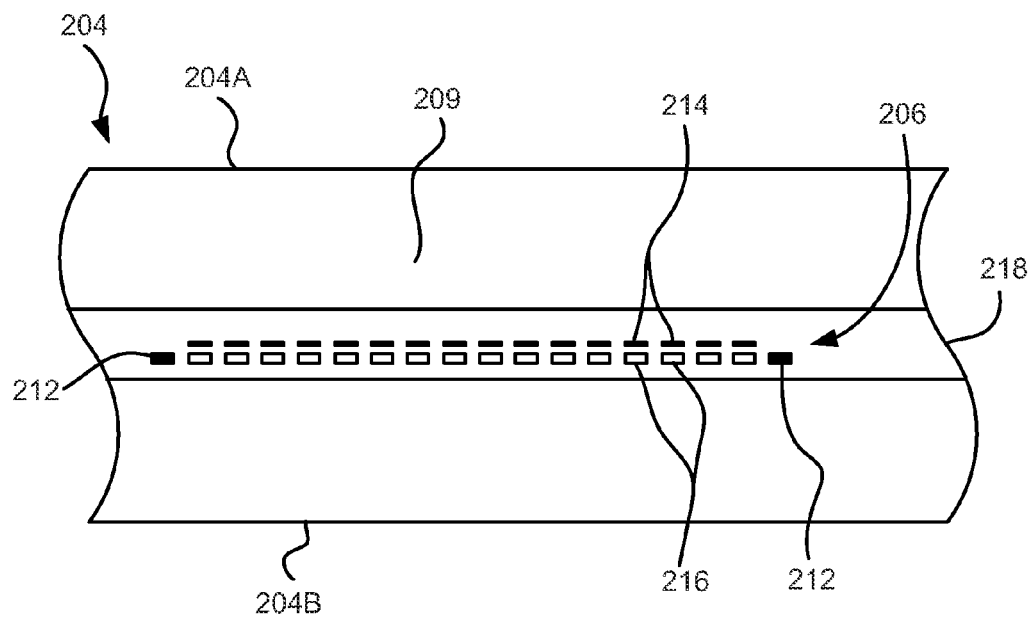
FIG. 2B is a detailed view taken from Circle 2B of FIG. 2A.

Referring now to FIG. 2B, the detailed view depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
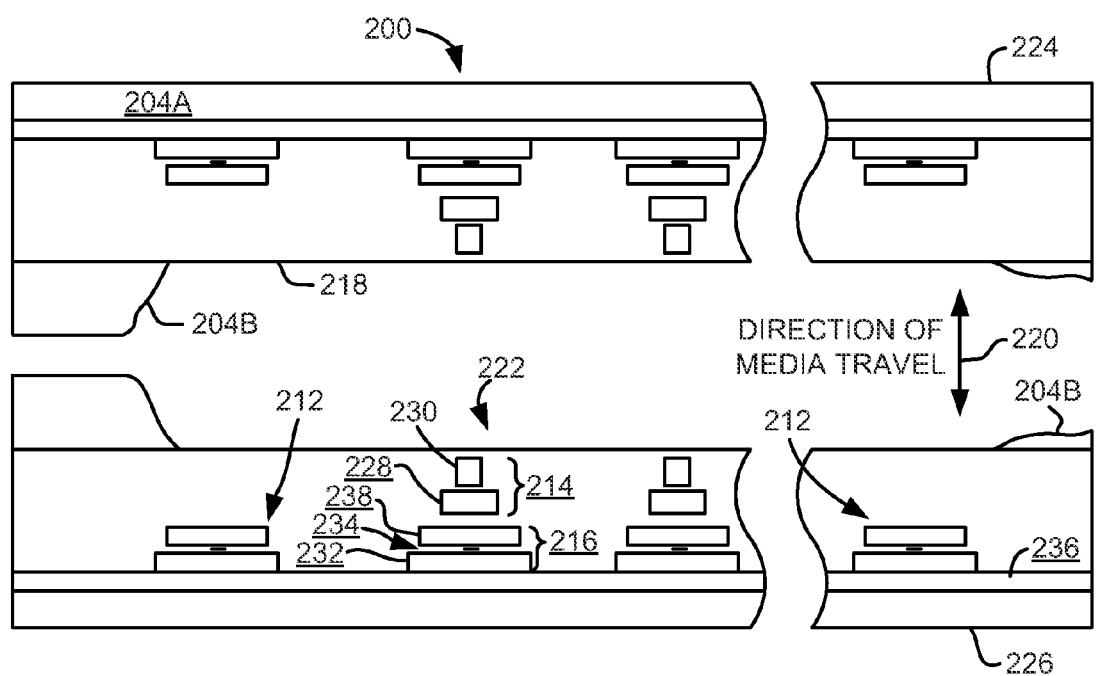
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
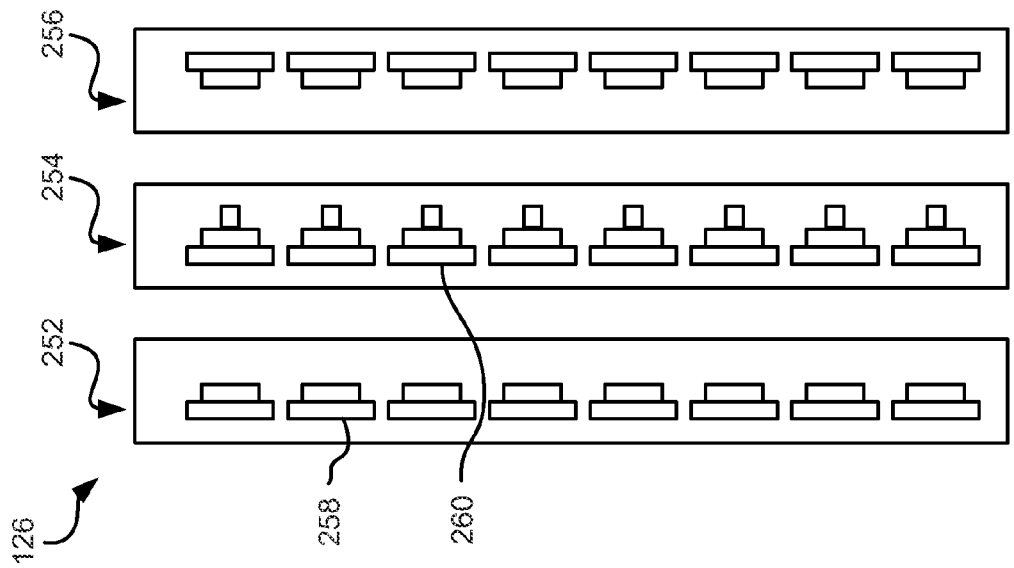
FIG. 4 is a partial tape bearing surface view of a magnetic head having a read-write-read configuration.
Figure 3:
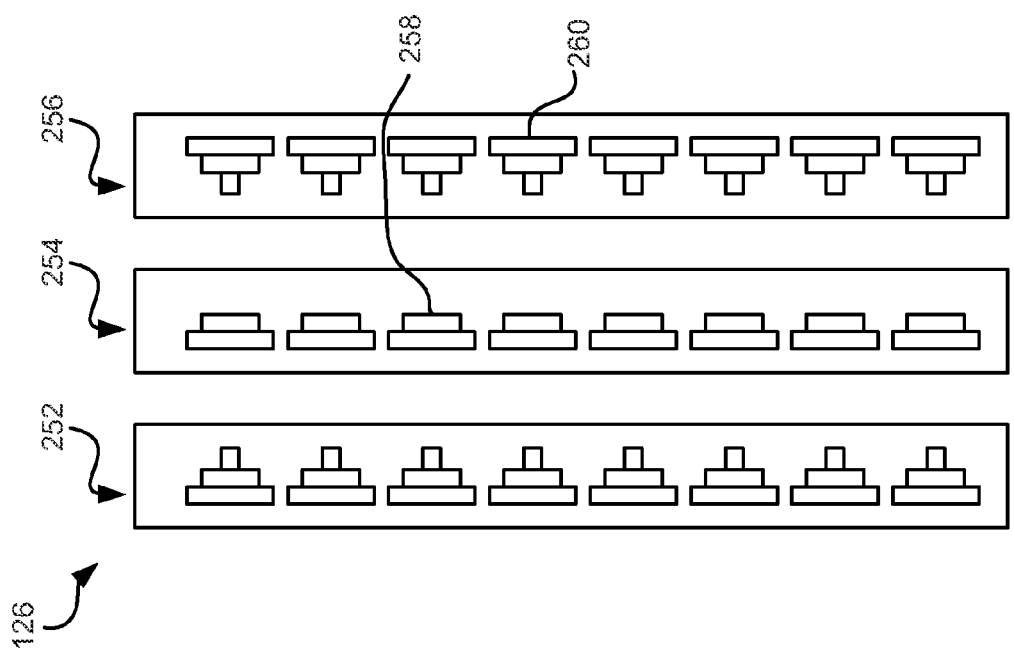
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
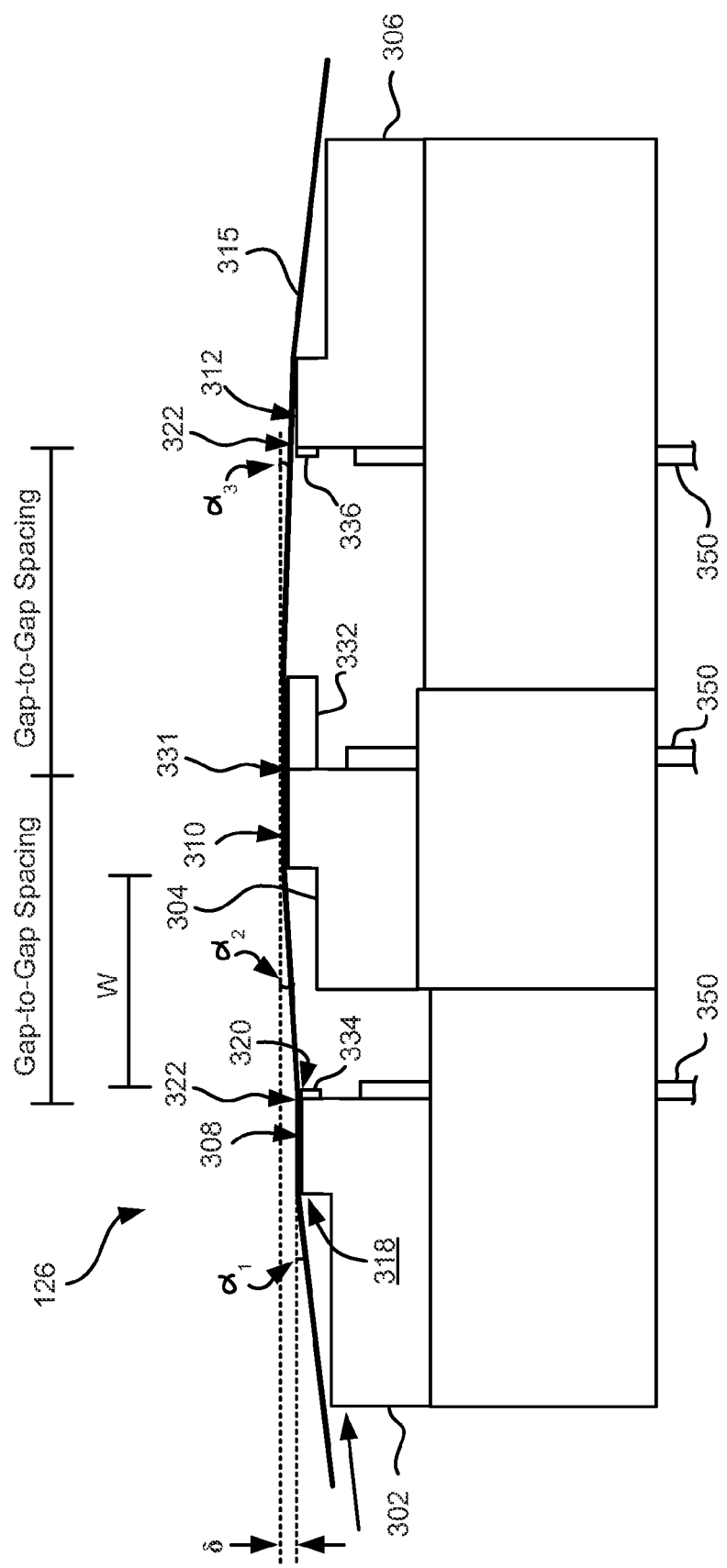
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
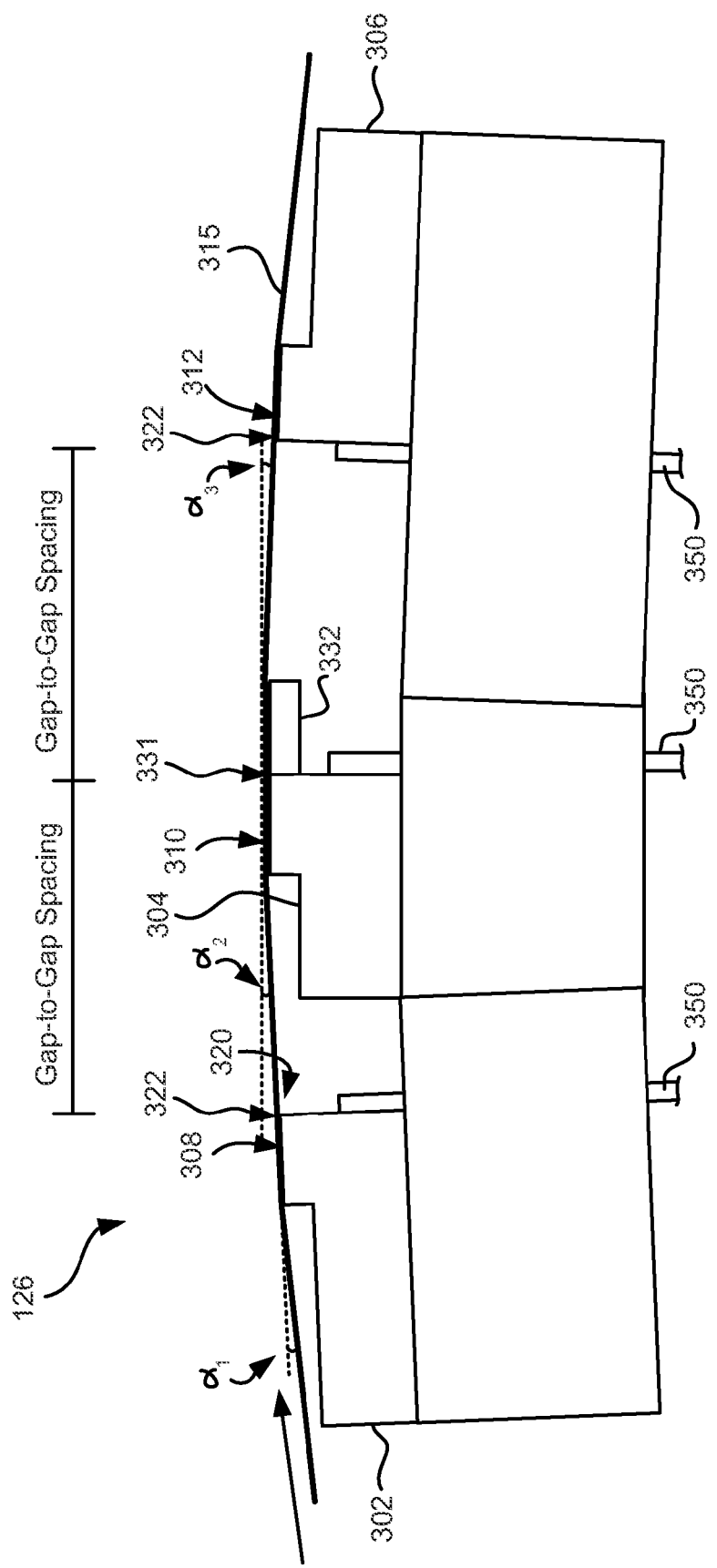
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for writeread-write applications. Additional aspects of these embodiments are similar to those given above.

Typically, the tape wrap angles may be set about midway between the embodiments shown in FIGS. 5 and 6.

Figure 7:
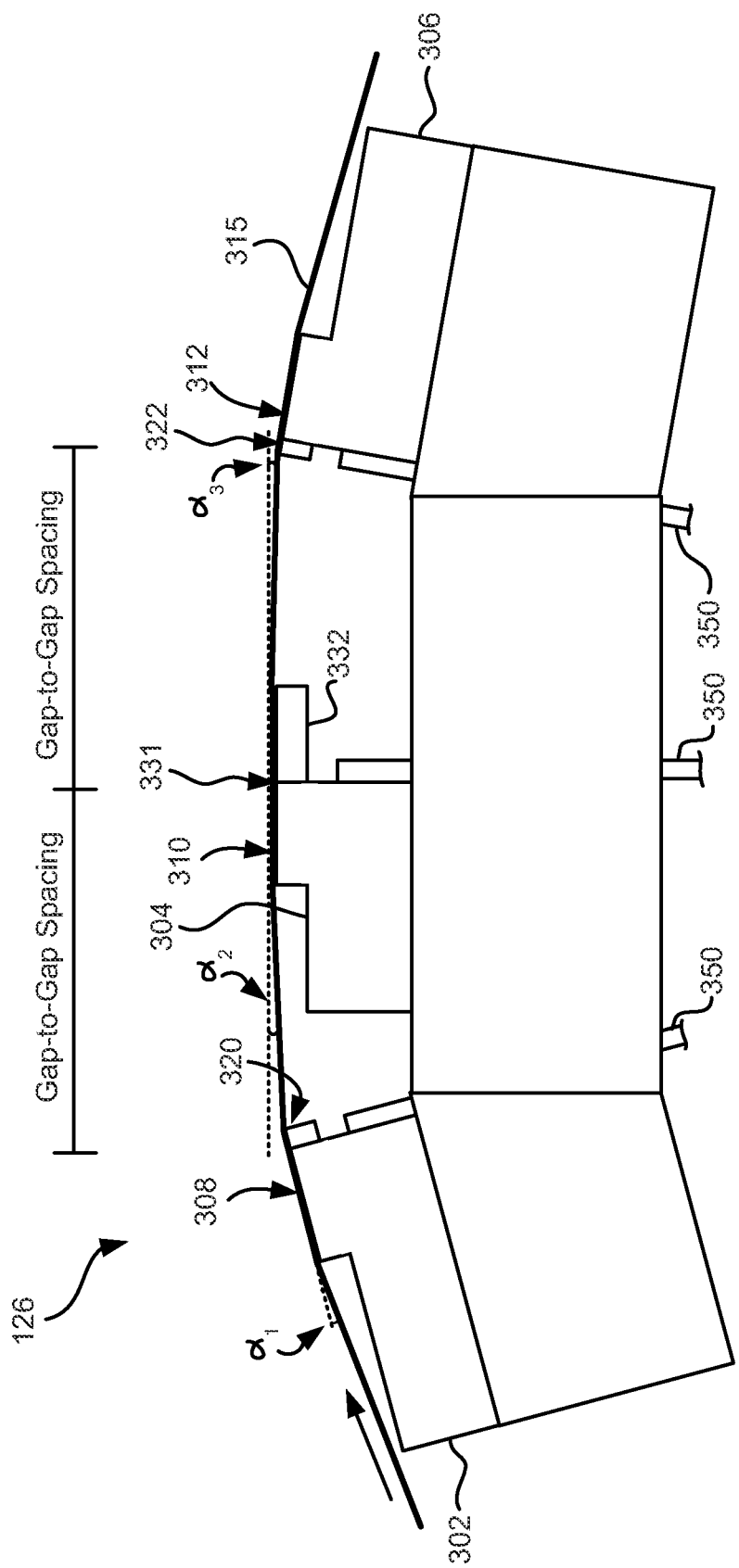
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

As alluded to above, timing based servo tracks preferably provide information about tapes during reading and/or writing operations. Such servo tracks may provide information to the drive regarding the cross track (lateral) position of the head relative to a data band flanked by the servo tracks. In various embodiments, the servo tracks may include additional information, such as information that allows the drive to determine the speed of the tape, longitudinal positioning along the tape, etc.

Various embodiments described herein provide timing based servo tracks which increase, and in some embodiments about double, the amount of servo information in the same physical space on a given tape, relative to conventional servo tracks having about the same physical space on tape. Thus, the areal density of servo information stored on magnetic tapes may be increased in preferred embodiments, as will soon become apparent.

FIGS. 8A-8B depict a product 800 for storing data, in accordance with one embodiment. As an option, the present product 800 may be implemented in conjunction with features from any other embodiment listed herein, such as those described with reference to the other FIGS. Of course, however, such product 800 and others presented herein may be used in various applications and/or in permutations which may or may not be specifically described in the illustrative embodiments listed herein. Further, the product 800 presented herein may be used in any desired environment.

Referring now to FIG. 8A, the product 800 includes a magnetic recording tape 802 having opposite ends 804, 806. Moreover, a longitudinal axis 808 of the magnetic recording tape 802 is defined between the ends 804, 806 thereof. It should be noted that the magnetic recording tape 802 of FIG. 8A is not drawn to scale, but rather is illustrated to show the features of the present embodiment.

Furthermore, although the magnetic recording tape 802 is shown having multiple servo tracks 810, according to various other embodiments, the magnetic recording tape 802 includes at least one servo track. Thus, depending on the magnetic recording tape 802 used, the tape may include at least two, at least three, multiple, etc. servo tracks, e.g., for increased accuracy, speed, etc. Referring back to FIG. 2A, the tape 208 includes 9 servo tracks 210 in accordance with one illustrative embodiment.

The magnetic recording tape 802 may be embodied with (e.g., as part of) and/or in a cartridge, such as cartridge 150 of FIG. 1A.

Referring now to the detailed view of FIG. 8B, the servo track 810 includes a plurality of first magnetic bars 812 and a plurality of second magnetic bars 814. Each of the first magnetic bars 812 preferably have a longitudinal axis, extending between opposite ends thereof, that is oriented at an angle $\phi$, between about 2 and about 88 degrees from the longitudinal axis 808 of the magnetic recording tape 802, but could be higher or lower depending on the desired embodiment. Moreover, each of the second magnetic bars 814 have a longitudinal axis oriented at an angle $\theta$ that is ±45 degrees from the longitudinal axis 808 of the magnetic recording tape 802. In a preferred embodiment, the longitudinal axes of the second magnetic bars 814 are each oriented substantially 90 degrees from the longitudinal axis 808 of the magnetic recording tape 802. Referring to the present description, "substantially 90 degrees" is intended to be within 1 degree of the stated angle (90 degrees), but could be higher or lower depending on the desired embodiment.

A servo frame may be defined as an adjacent set of the first and second magnetic bars 812, 814. Thus, in one embodiment, the servo track may have repeating sets of such frames. However, in preferred embodiments, the servo frames include additional bars. For example, with continued reference to FIG. 8B, the servo track 810 has a plurality of third magnetic bars 820 oriented to form chevron-like patterns with the first magnetic bars 812. The third magnetic bars 820 are also angled, e.g., between about 2 and about 90 degrees from the longitudinal axis 808 of the magnetic recording tape 802. Note that the third magnetic bars 820 may have an angular value similar to the angle of the first bars 812, but in reverse thereto at a negative angle. However, the angular values of the first and third magnetic bars may be different.

Moreover, as illustrated, the second magnetic bars 814 are positioned between sets of the first and third magnetic bars 812, 820 in a larger servo frame. The second magnetic bars 814 may be positioned away from the point of closest approach 822 of the first and third magnetic bars closest thereto. Put another way, the second magnetic bars 814 are not centered laterally in the servo track, but rather are positioned more towards the wider part of the chevron-like pattern than the narrower "tip" region thereof.

As an option, the servo track may have a plurality of fourth magnetic bars 824, the fourth magnetic bars 824 each having a longitudinal axis oriented ±45 degrees, and preferably substantially 90 degrees, from the longitudinal axis of the magnetic recording tape. The fourth magnetic bars 824 may be positioned closer to one side of the associated servo track (top of the tape in FIG. 8B) than the second magnetic bars 814.

Note that FIG. 8B depicts a 5-5-5-5 pattern (4 sets of 5 bars) in each servo frame 830. Alternative embodiments may have a 5-5-5-4-4-4-4 or any other pattern in a servo frame, such as an "N"-type pattern formed by some or all of the magnetic bars, an "M"-type pattern formed by some or all of the magnetic bars, a "V"-type pattern formed by some or all of the magnetic bars, etc. In this example, the shorter second and fourth bars 814, 824 are tucked in the otherwise empty and unused space between the longer first and third bars 812, 820. The second and fourth bars 814, 824 are shown orthogonal to the tape travel direction and thus may be used to provide tape skew and tape velocity detection, which are a necessary component in timing based servoing. In this manner every group of first and third magnetic bars 812, 820 can be used for position recovery.

With continued reference to FIG. 8B, the lengths of the second and fourth magnetic bars 814, 824 along the longitudinal axes thereof are less than the width of the servo track 810, where the width $w_1$ of the servo track 810 is defined in a direction perpendicular to the longitudinal axis 808 of the magnetic recording tape 802 between sides of the servo track. The sides of each servo track may be considered to extend along imaginary lines extending along ends of the first magnetic bars. The width $w_1$ of the servo track 810 may be less than about 250 microns, preferably less than 200 microns. The effective width of the servo reader is smaller, e.g., between 1 and 10 microns.

The lengths of the second and fourth magnetic bars 814, 824 are shorter than the width $w_1$ of the associated servo track 810. For example, in various embodiments, the lengths of the second and/or fourth magnetic bars 814, 824 are less than 85%, more preferably less than 80% of the width $w_1$ of the associated servo track. In some embodiments, the lengths of the second and/or fourth magnetic bars 814, 824 are between 33% and 67% of the width $w_1$ of the associated servo track. The lengths of the second and fourth magnetic bars 814, 824 may be the same or different. In a preferred embodiment, the lengths of the second and/or fourth magnetic bars 814, 824 are slightly longer than one-half the width $w_1$ of the associated servo track to enable decoding across the full width of the servo track 810.

In one preferred embodiment, depicted in FIG. 8C as a variant of the embodiment of FIG. 8B, the lengths of at least some of the second and/or fourth magnetic bars are one half a width $w_1$ of the servo track, plus 0.25 to 3 microns. This range covers one half the track width of present and future servo readers, and thus the servo reader should always be able to detect the second and/or fourth magnetic bars 814, 824. Moreover, where both second and fourth magnetic bars 814, 824 are present, the detection of both second and fourth magnetic bars 814, 824 may be used as a reference indicative of the longitudinal centerline 834 of the servo track 810. Such information may be useful, e.g., for calibration during operation.

In another embodiment, depicted in FIG. 8D as a variant of the embodiment of FIG. 8B, the lengths of at least some of the second and/or fourth magnetic bars are one half a width of the servo track, minus 0.25 to 3 microns. In this case, the lack of detection of second and fourth magnetic bars 814, 824 may be used as a reference, e.g., to identify a center of the servo track.

The timing between one of the first and one of the third magnetic bars 812, 820 may be used in conjunction with linear tape velocity information to determine the lateral position of the head relative to the tape.

The linear tape velocity information may be derived from selected magnetic bars in a single servo frame, e.g., by determining a timing between the first and last ones of the second magnetic bars 814 in one servo frame, by determining a timing between the two of the fourth magnetic bars 824 in one servo frame, the timing between one of the second and one of the fourth magnetic bars 814, 824; etc. The timing can then be correlated to the distance the tape has traveled to compute the velocity. Lookup tables may also be used. A benefit of deriving the timing for determining the linear velocity using the second or fourth bars is that they are less susceptible to tape skew and other effects. Moreover, the timing may be determined within the frame, and used to quickly compute the lateral position using the chevron-derived information, thereby enabling much faster lateral positioning. In alternate embodiments, the linear tape velocity information may be derived using magnetic bars in sequential servo frames.

Spacing may be present between servo frames to assist the system in detecting the locations of the frames, e.g., by detecting the delay between servo frames.

In one embodiment, the tape skew may be detected by detecting an offset in the signals of the servo readers above the parallel servo tracks as they detect the second and/or fourth magnetic bars 814, 824. If no tape or head skew is present, and the second and/or fourth magnetic bars 814, 824 are aligned laterally on the tape, then no difference in the servo signals should be detected. If skew is present, the timing of the servo signal from one servo reader will be offset from the timing of the servo signal from the other servo reader. The magnitude and sign of this offset directly relate to the direction and magnitude of the skew. This is enabled because the second and/or fourth magnetic bars 814, 824 are oriented orthogonal to the longitudinal axis 808 of the magnetic recording tape 802.

As noted above, the sets of the magnetic bars may be grouped into servo frames 830. Preferably, a position of at least one of the first magnetic bars in one of the frames is different than in other frames thereby defining encoded information in the servo track, as shown at 832. In other words, one or more of the bars may be advanced or delayed by some amount that is detectable and usable to discern additional information. For example, such encoded information may include linear position information, etc. Encoding schemes of a type known in the art may be used.

The magnetic tape 802 may be used by an apparatus such as that shown in FIG. 1.

Figure 9:
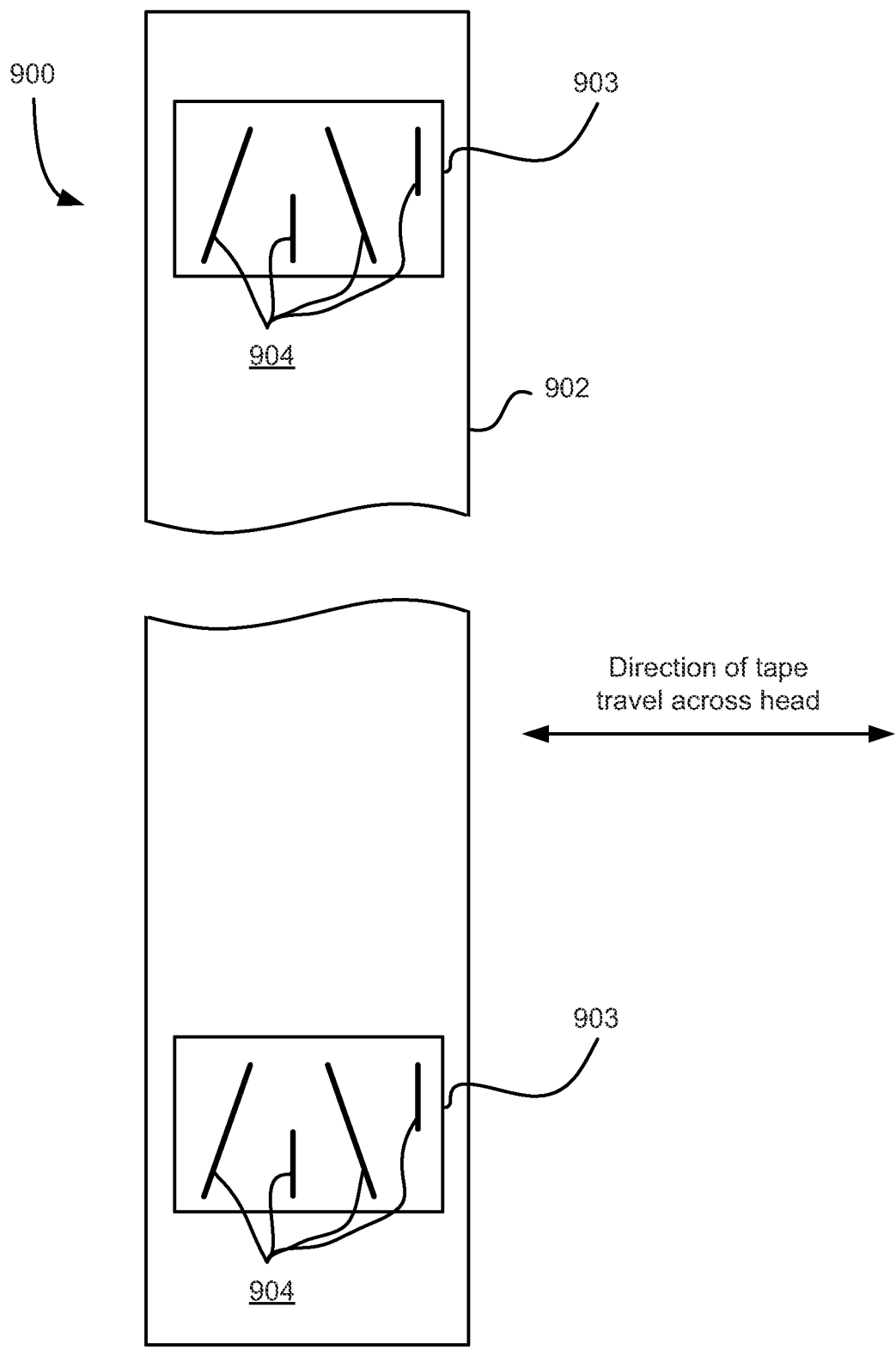
FIG. 9 is a side view of an apparatus for writing a servo pattern on a magnetic recording tape, according to one embodiment.

FIG. 9 depicts an apparatus 900 to write the servo patterns onto the magnetic recording tape, in accordance with one embodiment. As an option, the present apparatus 900 may be implemented in conjunction with features from any other embodiment listed herein, such as those described with reference to the other FIGS. Of course, however, such apparatus 900 and others presented herein may be used in various applications and/or in permutations which may or may not be specifically described in the illustrative embodiments listed herein. Further, the apparatus 900 presented herein may be used in any desired environment. Thus FIG. 9 (and the other FIGS.) should be deemed to include any and all possible permutations.

The apparatus 900 may include one or more magnetic heads 902 each having at least one servo writer 903 for writing the magnetic bars to the magnetic recording tape. Ideally, enough servo writers 903 are present to write all servo tracks on the tape simultaneously. As shown, each servo writer 903 has write gaps 904 oriented to write sets of the magnetic bars on the magnetic recording tape for creating a servo track 810 as shown in FIG. 8B. However, in other embodiments, the number and/or orientation of the write gaps 904 may be different, depending on the servo track to be written, as would be understood by one skilled in the art upon reading the present description.

The apparatus 900 may also include a drive mechanism for passing the magnetic recording tape over the magnetic head, e.g., as shown in FIG. 1A; and a controller electrically coupled to the magnetic head, e.g., as also shown in FIG. 1A. The controller may use known servo writing techniques when controlling the magnetic head 902.

In operation, one or more servo tracks are written to a magnetic tape by the apparatus. The write gaps 904 may each emit flux concurrently. In other embodiments, one or more of the write gaps may be separately addressable from the other write gaps. Accordingly, such separately-addressable write gaps may be associated with a different write coil and yoke than the other write gaps.

As data is written to and/or read from a magnetic tape, operating conditions (e.g., temperature, humidity, tape tension, etc.) may fluctuate, thereby affecting the characteristics of the magnetic tape itself. Thus, during operation a magnetic tape may experience TDI due to lateral contraction and/or expansion in addition to skew, shifting, etc., thereby affecting the spacing and orientation of the data tracks written thereon, e.g., relative to the transducers of a magnetic head. To compensate for such conditions, a magnetic head may be statically oriented at a nominally tilted angle relative to a position perpendicular to the longitudinal axis of the tape, e.g., to align transducers of the magnetic head with the data tracks. Thereafter, smaller angular adjustments (e.g., about 1 degree or lower, but could be higher) may be made to the already nominally rotated module in order to compensate for any variation in TDI of the tape, thereby keeping the transducers aligned with the tracks on the tape.

However, when the magnetic head is oriented at a nominally tilted angle to compensate for TDI, servo readers on the magnetic head are tilted as well. Therefore it is desirable to incorporate servo formats that improve track positioning and tape skew detection when the servo readers are tilted. Various embodiments described herein include servo tracks having magnetic bars compatible with nominally rotated magnetic heads, as will be discussed in further detail below.

FIGS. 10A-10D depict a product 1000 for storing data, in accordance with one embodiment. As an option, the present product 1000 may be implemented in conjunction with features from any other embodiment listed herein, such as those described with reference to the other FIGS. Of course, however, such product 1000 and others presented herein may be used in various applications and/or in permutations which may or may not be specifically described in the illustrative embodiments listed herein. Further, the product 1000 presented herein may be used in any desired environment. Thus FIGS. 10A-10D (and the other FIGS.) should be deemed to include any and all possible permutations.

Referring now to FIG. 10A, the product 1000 includes a magnetic recording tape 1002 having opposite ends 1004, 1006. According to one embodiment, the magnetic tape 1002 may be used by an apparatus such as that shown in FIG. 1. With continued reference to FIG. 10A, a longitudinal axis 1008 of the magnetic recording tape 1002 is defined between the ends 1004, 1006 thereof. It should be noted that the magnetic recording tape 1002 of FIG. 10A is not drawn to scale, but rather is illustrated to show the features of the present embodiment.

Furthermore, although the magnetic recording tape 1002 is shown having multiple servo tracks 1010, according to various other embodiments, the magnetic recording tape 1002 includes at least one servo track, at least two, at least three, multiple, etc. servo tracks. Moreover, the magnetic recording tape 1002 may be embodied with and/or in a cartridge, such as cartridge 150 of FIG. 1A.

Referring now to the detailed view of FIG. 10B, the servo track 1010 includes a plurality of first magnetic bars 1012 and a plurality of third magnetic bars 1020. As illustrated, each of the third magnetic bars 1020 are oriented to form chevron-like patterns with the first magnetic bars 1012. Furthermore, the first and third magnetic bars 1012, 1020 each have a longitudinal axis, extending between opposite ends thereof, which are oriented at a first and second angle $\phi_1$, $\phi_2$ respectively. According to different embodiments, the first and second angles $\phi_1$, $\phi_2$ may be from about 2 to about 88 degrees from the longitudinal axis 1008 of the magnetic recording tape 1002, but could be higher or lower depending on the desired embodiment. However, the second angle $\phi_2$ preferably has a different numerical absolute value than the first angle $\phi_1$, i.e. the first and second angles $\phi_1$, $\phi_2$ have different values.

According to one embodiment, the angle at which the magnetic bars of the servo tracks are oriented may depend, at least in part, on the orientation of a nominally rotated magnetic head and/or servo readers thereon. Ideally, the orientations of the first and third magnetic bars 1012, 1020 are such that the plane of deposition of the servo readers of the head in the nominal orientation is about centered between the longitudinal axes of the first and third magnetic bars, as exemplified in FIG. 10D.

Moreover, tips of the first and/or third magnetic bars 1012, 1020 may be positioned to be aligned with a straight edge of the servo track, thereby achieving a desired servo track width $w_2$. According to an example, which is in no way intended to limit the invention, if a servo writer writing the first and third magnetic bars 1012, 1020 was rotated such that the first angle $\phi_1$ increases and the second angle $\phi_2$ decreases, the tips of the first and third magnetic bars 1012, 1020 thus written would move away from the nominal edges of the servo track. Accordingly, the write gaps can be configured to write the respective magnetic bars such that their tips are aligned along the edges of the servo track.

The servo track 1010 may also include a plurality of second and/or fourth magnetic bars 1014, 1024 extending between the sides of the servo track 1010, as shown in FIG. 10B. It should be noted that the second and fourth magnetic bars 1014, 1024 may be considered to be equivalents in various embodiments described herein, and aside from positioning on the tape, may be used in a product, according to one embodiment, includes a magnetic recording tape having opposite ends, a longitudinal axis of the magnetic recording tape being defined between the ends. The magnetic recording tape has at least one servo track, the at least one servo track having a plurality of first magnetic bars and a plurality of third magnetic bars oriented to form chevron-like patterns with the first magnetic bars. The first magnetic bars each have a longitudinal axis oriented at a first angle between 2 and 88 degrees from the longitudinal axis of the magnetic recording tape. The third magnetic bars each have a longitudinal axis oriented at a second angle between 2 and 88 degrees from the longitudinal axis of the magnetic recording tape, the second angle having a different numerical absolute value than the first angle.

According to a preferred embodiment, the sides of each servo track 1010 extend along ends of the first magnetic bars

1012. Thus, the width $w_2$ of the servo track may be defined in a direction perpendicular to the longitudinal axis 1008 of the magnetic recording tape between sides of the servo track, e.g., between ends of the first magnetic bars 1012.

According to different embodiments, the first, second, third and/or fourth magnetic bars 1012, 1014, 1020, 1024 may include dimensions (e.g., lengths), orientation, spacing, quantities, etc., of any of the embodiments described above, e.g., with reference to the first, second, third and/or fourth magnetic bars 812, 814, 820, 824 of FIGS. 8B-8D. According to one embodiment, the sets of the magnetic bars may be grouped into servo frames 1030. As previously described, one or more of the bars may be advanced or delayed by some amount that is detectable and usable to discern additional information. Thus, a position of at least one of the first magnetic bars in one of the frames may be different than in other frames thereby defining encoded information in the servo track, as shown at 1032. For example, such encoded information may include linear position information, etc.

Figure 10C:
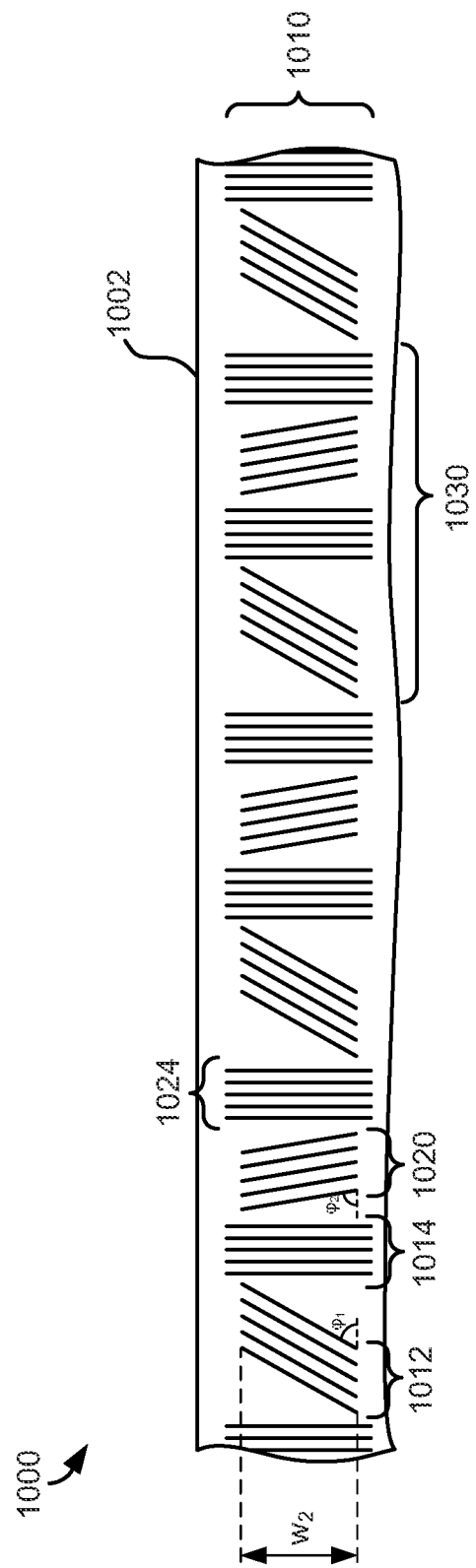
FIG. 10C is a detail representational view of an alternate embodiment of the magnetic recording tape of FIG. 10B.

However, depicted in FIG. 10C as a variant of the embodiment of FIG. 10B, the lengths of at least some of the second and/or fourth magnetic bars 1014, 1024 may extend past the sides of the servo track 1010, e.g., wider than the servo track width $w_2$. In other embodiments, second and/or fourth magnetic bars 1014, 1024 may extend up to the edges of the servo track, e.g., have a length equal to the width $w_2$ of the servo track.

In a preferred embodiment, the second and fourth magnetic bars 1014, 1024 may each have a longitudinal axis oriented substantially 90 degrees from the longitudinal axis of the magnetic recording tape. This orientation may enable detection of skew in spite of tape lateral dimensional expansion and/or contraction. In contrast, if the second magnetic bars were oriented at an angle with an absolute value less than 90 degrees, the relative timing between the two servo tracks would change with the lateral expansion and/or contraction of the tape, thereby resulting in misdetection of the tape skew. Thus, the second and fourth magnetic bars 1014, 1024 oriented substantially 90 degrees from the longitudinal axis of the magnetic recording tape may be used in conjunction with the nominally tilted first and third magnetic bars 1012, 1020, e.g., to detect tape skew, as will be discussed in further detail below.

Figure 10D:
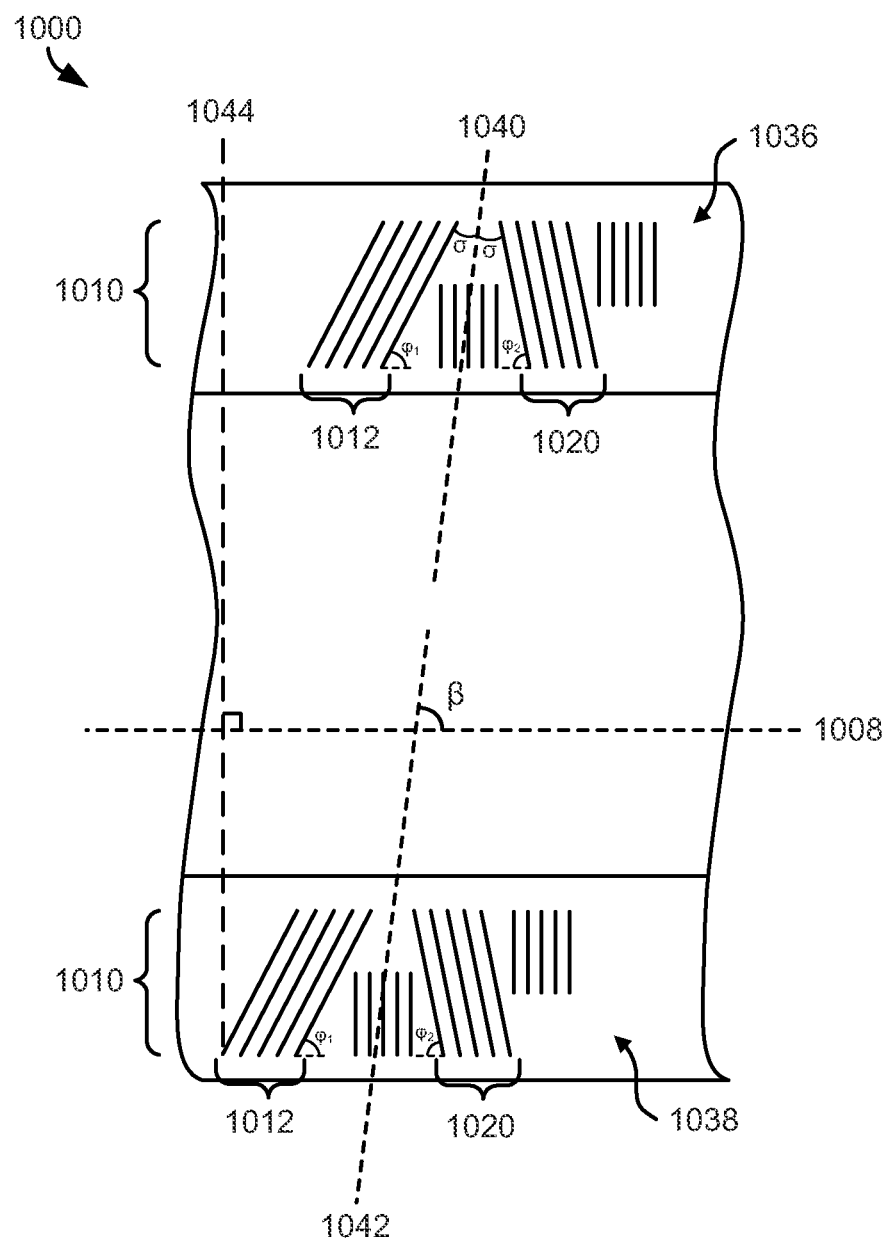
FIG. 10D is a detail representational view of the magnetic recording tape taken from box DD of FIG. 10A, according to one embodiment.

Looking now to FIG. 10D, a detailed view of two servo frames 1036, 1038 of a first and second of the servo tracks 1010 is illustrated according to an exemplary embodiment. As described above, a servo frame may be defined as an adjacent set of magnetic bars. Thus, in one embodiment, each of the servo tracks may have repeating sets of such frames along the length of tape.

With continued reference to FIG. 10D, the angular displacement for the first bars 1012 of both the servo tracks 1010 are preferably about equal, e.g., their respective values are within 1 degree of each other, but could be higher or lower depending on the desired embodiment. In other words, the angular orientation of the first bars 1012 of one of the servo frames 1036 is about equal to the angular orientation of the first bars 1012 of the other servo frame 1038, e.g., relative to a reference line. Likewise, the angular displacement for the third bars 1020 of both the servo tracks 1010 are preferably about equal. Thus, as shown, a centerline 1040 oriented at equal angles σ between the adjacent first and third magnetic bars 1012, 1020 of the first servo frame 1036 is substantially collinear with a centerline 1042 between the first and third magnetic bars 1012, 1020 of the second servo frame 1038.

To achieve substantially collinear centerlines 1040, 1042 in view of the angular displacement for the first and third bars 1012, 1020 of both the servo tracks 1010, servo frames 1036, 1038 are preferably offset from (e.g., not aligned with) one another relative to a line 1044 oriented perpendicular to the longitudinal axis of the magnetic recording tape as shown in FIG. 10D. Thus, the substantially collinear centerlines 1040, 1042 may be oriented at an angle β that is preferably less than 90 degrees from the longitudinal axis 1008 of the magnetic recording tape. It should also be noted that the angle β at which the centerlines 1040, 1042 are oriented (also referred to herein as an angular displacement of the centerlines) is geometrically related to the offset between the servo frames 1036, 1038. Thus, according to various embodiments, the angle β of the centerlines 1040, 1042 may be determined (e.g., set) based on the offset between corresponding servo frames 1036, 1038.

In a different embodiment, the angular displacement of the centerlines for each of the servo frames may generally correlate to a nominal tilt angle of the transducer array of a drive compatible with the product. Therefore, in one embodiment, the nominal angle at which a magnetic head may be oriented is about the same as the angular displacement of the centerlines. As a result, the servo readers of the magnetic head may be aligned with the centerlines in about collinear fashion, and thus the offset servo frames 1036, 1038.

Moreover, this type of arrangement, when used in conjunction with the second magnetic bars, is particularly useful for detecting tape skew, e.g., using the second and/or fourth magnetic bars 1014, 1024. As described above, the second magnetic bars 1014 are preferably oriented substantially 90 degrees from the longitudinal axis of the magnetic recording tape. This orientation enables detection of skew in spite of tape lateral dimensional expansion and/or contraction, as will soon become apparent.

As the tape expands and/or contracts, the first and third magnetic bars 1012, 1020 having a chevron pattern expand and/or contract as well. Similarly, during run time, the tape shifts laterally relative to the head. This causes the apparent spacing between each of the first and third magnetic bars 1012, 1020 to change with the expansion, contraction and/or shifting. Additionally, the angular orientation of the first and third magnetic bars 1012, 1020 fluctuates with tape expansion, contraction and/or skew. However, the second and fourth magnetic bars 1014, 1024, preferably having an orientation substantially 90 degrees from the longitudinal axis of the magnetic recording tape, do not experience such effects during lateral expansion, contraction and/or lateral shifting of the tape. Therefore, the second and/or fourth magnetic bars 1014, 1024 may be used (e.g., as a reference) to effectively detect skew of a tape using any of the embodiments described and/or suggested above, regardless of whether the tape is experiencing lateral expansion, contraction, shifting, etc.

Various embodiments described herein may be able to detect when a tape is experiencing skew, for enabling compensation for such skew. FIG. 11 depicts a method 1100 for detecting skew, in accordance with one embodiment. As an option, the present method 1100 may be implemented in conjunction with features from any other embodiment listed herein, such as those described with reference to the other FIGS. Of course, however, such method 1100 and others presented herein may be used in various applications and/or in permutations which may or may not be specifically described in the illustrative embodiments listed herein. Further, the method 1100 presented herein may be used in any desired environment. Thus FIG. 11 (and the other FIGS.) should be deemed to include any and all possible permutations.

Referring now to FIG. 11, the method 1100 for detecting skew includes reading at least two servo tracks on a magnetic recording tape, the servo tracks each having a plurality of first magnetic bars, a plurality of second magnetic bars, and a plurality of third magnetic bars oriented to form chevron-like patterns with the first magnetic bars. The second magnetic bars are positioned between sets of the first and third magnetic bars in a servo frame, the first magnetic bars each having a longitudinal axis oriented a first angle between 2 and 88 degrees from the longitudinal axis of the magnetic recording tape. The third magnetic bars each have a longitudinal axis oriented at a second angle between 2 and 88 degrees from the longitudinal axis of the magnetic recording tape, the second angle having a different numerical absolute value than the first angle. See operation 1102.

With continued reference to FIG. 11, the method 1100 additionally includes determining a timing offset between detection of the second magnetic bars of the servo tracks. See operation 1104. According to one embodiment, the timing between the second magnetic bars (e.g., see 1014 of FIGS. 10B-10D) on a given tape may be used to calculate the linear tape velocity information, which may then be used in conjunction with signals from the first and third magnetic bars to determine the lateral position of the head relative to the tape. Thus, the linear tape velocity information may be derived from selected magnetic bars in a single servo frame. Referring back to FIGS. 10B-10D, linear tape velocity information may be calculated by determining a timing between the first and last ones of the second magnetic bars 1014 in one servo frame 1030, by determining a timing between the two of the fourth magnetic bars 1024 in one servo frame 1030, the timing between one of the second and one of the fourth magnetic bars 1014, 1024, etc. The timing may then be correlated to the distance the tape has traveled to compute the velocity. Moreover, in other embodiments, lookup tables may also be used to determine a timing offset.

With continued reference to FIG. 11, operation 1106 of method 1100 includes calculating a skew based on the timing offset. As described above, the tape skew may be derived by detecting an offset in the signals of the servo readers above the parallel servo tracks as they detect the magnetic bars. Referring back to FIGS. 10B-10D, tape skew may be detected by using the second and/or fourth magnetic bars 1014, 1024 of two servo tracks 1010. If no tape skew is present, the second and/or fourth magnetic bars 1014, 1024 should be aligned laterally on the tape, and a comparison of the signals from the two servo sensors reading the second and/or fourth magnetic bars 1014, 1024 will indicate no tape skew. However, if skew is present, the timing of the servo signal from one servo reader will be offset from the timing of the servo signal from the other servo reader in a manner indicative of tape skew. Moreover, the magnitude and sign of this offset directly relate to the direction and magnitude of the skew. This is enabled because the second and/or fourth magnetic bars 1014, 1024 are oriented orthogonal to the longitudinal axis 1008 of the magnetic recording tape 1002, and as such their orientations are not affected by tape lateral expansion and contraction.

According to one embodiment, an apparatus may include a controller, e.g., 128 of FIG. 1A, which may be configured to perform at least one, preferably all, of the operations of method 1100. According to an example, which is in no way intended to limit the invention, the controller may generate a skew error signal based on the two readings obtained in operation 1102 of method 1100, e.g., the skew error signal being indicative of a skew angle between a magnetic head and the magnetic recording tape.

Upon detecting skew, steps may preferably be taken to reduce such skew. In one embodiment, the controller may be further configured to minimize a skew angle between the magnetic head and the magnetic recording tape based on the calculated skew. According to one embodiment, this may be achieved by tilting the magnetic head from its nominal or then-current position to compensate for the tape skew. Thus, a controller may be electrically coupled to a magnetic head and further configured to position the magnetic head based on signals derived from the at least one servo track on a magnetic recording tape, e.g., using an actuator of a type known in the art. According to various embodiments, the controller may be electrically connected to a magnetic head to control positioning thereof based on a number of different characteristics.

In an exemplary embodiment, a controller may be configured to ensure that an absolute value of an angle between a plane of deposition of the servo reader of the magnetic head and each of the first magnetic bars is nominally the same as an absolute value of an angle between a plane of deposition of the servo reader of the magnetic head and each of the third magnetic bars. As described above, this may ensure that the nominal angle at which a magnetic head may be oriented is about the same as the angular displacement of the centerlines. As a result, the servo readers of the magnetic head may be oriented such that they align with the nominally rotated first and/or third data bands described above, thereby preferably improving performance thereof.

Referring back to FIGS. 10B-10D, although the first and third magnetic bars 1012, 1020 are oriented at an angular displacement such that the first and second angles $\phi_1$, $\phi_2$ thereof are unequal, the opposite tips of the first and third magnetic bars 1012, 1020 preferably lie on two straight imaginary lines oriented parallel to the longitudinal axis 1008 of the magnetic recording tape 1002. In other words, the ends of the first and third magnetic bars 1012, 1020 are preferably aligned in a direction 1016 along the longitudinal axis 1008 of the magnetic recording tape 1002.

However, in other embodiments, the opposite tips of the first and third magnetic bars may not be aligned after writing of the servo tracks. In such embodiments it may be preferable to "trim" the edges such that the tips of the first and/or third magnetic bars 1012, 1020 are aligned in the in-track direction, e.g., to form the edges of a servo track width as illustrated in FIG. 10B-10C. However, in other embodiments, the edges of the first and/or third magnetic bars 1012, 1020 may remain misaligned, e.g., they may extend past the edges of the servo track width. According to one embodiment, the misaligned tips of the first and third magnetic bars 1012, 1020 may be the result of an apparatus designed to write such magnetic bars to the tape, e.g., to form servo tracks as will be discussed in further detail below with reference to FIGS. 12-13B.

Figure 12:
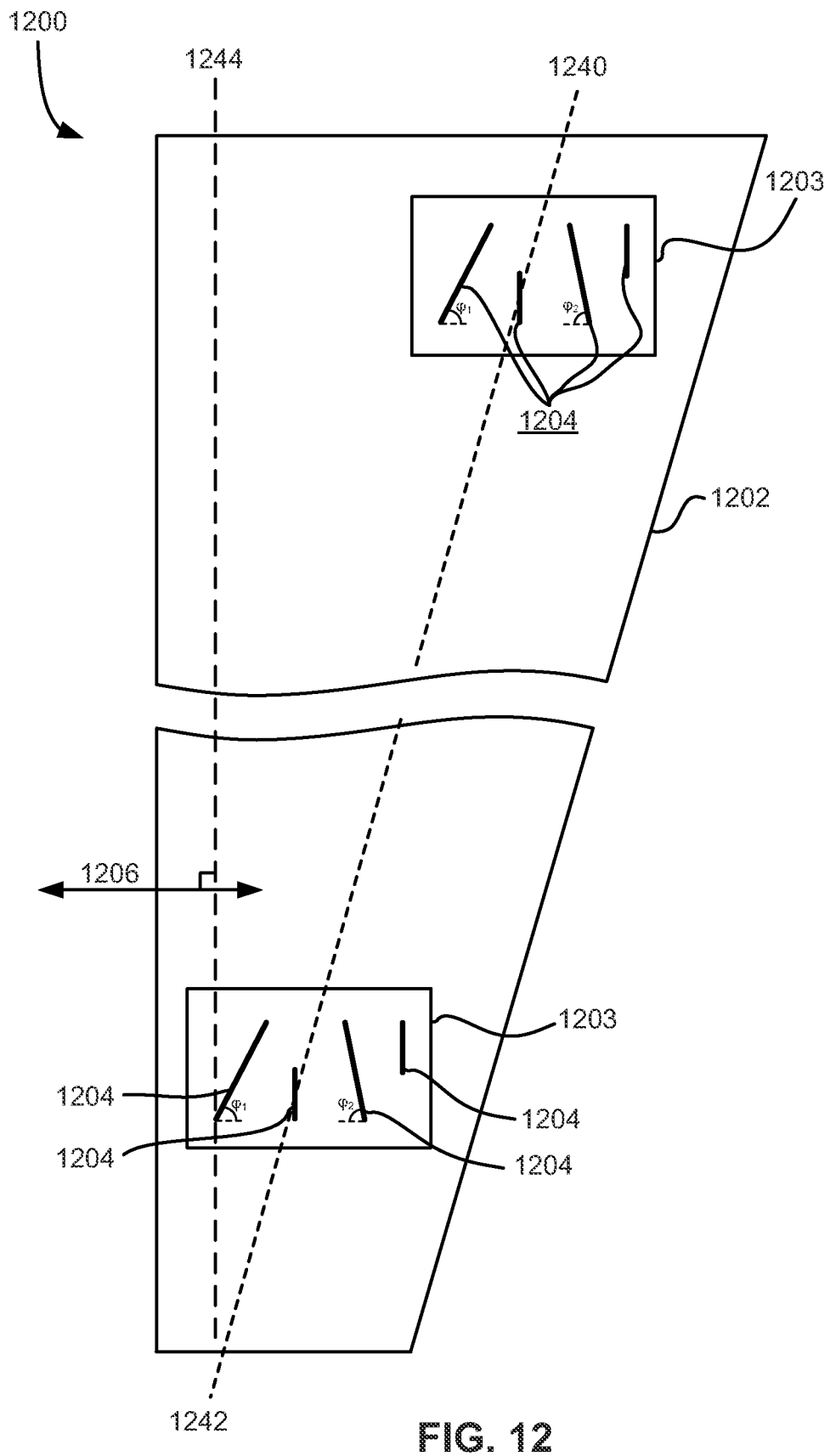
FIG. 12 is a partial media-facing surface view of an apparatus having a magnetic head, according to one embodiment.

FIG. 12 depicts an apparatus 1200 for writing servo tracks, in accordance with one embodiment. As an option, the present apparatus 1200 may be implemented in conjunction with features from any other embodiment listed herein, such as those described with reference to the other FIGS. Of course, however, such apparatus 1200 and others presented herein may be used in various applications and/or in permutations which may or may not be specifically described in the illustrative embodiments listed herein. Further, the apparatus 1200 presented herein may be used in any desired environment. Thus FIG. 12 (and the other FIGS.) should be deemed to include any and all possible permutations.

As illustrated in FIG. 12, the apparatus 1200 includes a magnetic head 1202, but may include more according to other embodiments. Furthermore, the magnetic head 1202 has servo writers 1203 and write gaps 1204 configured to write at least a first and second servo track on a magnetic tape (not shown) having a plurality magnetic bars. Ideally, enough servo writers 1203 are present to write all servo tracks on a tape simultaneously, e.g., to minimize write times, operation costs, performance, etc.

As shown, each servo writer 1203 has write gaps 1204 oriented to write sets of the magnetic bars on a magnetic recording tape for creating a servo track, e.g., see 1010 of FIGS. 10A-10D.

Referring again to FIG. 12, the angled write gaps 1204 are oriented at angles $\phi_1$, $\phi_2$, e.g., corresponding to the selected angular values for the first and third magnetic bars 1012, 1020, e.g., as illustrated in FIGS. 10B-10D. Moreover, the servo writers 1203 of FIG. 12 are positioned such that the centerlines 1240, 1242 thereof between the angled write gaps 1204 for writing the first and third magnetic bars are substantially collinear with each other. Thus, during operation, the write gaps 1204 of each of the servo writers 1203 on the magnetic head 1202 may emit a concentrated flux concurrently, thereby writing the servo tracks to a magnetic tape (not shown) traveling across the head 1202.

As described above, to achieve substantially collinear centerlines 1240, 1242 in view of the angular displacement of the write gaps 1204, the servo writers 1203 are preferably offset from (e.g., not aligned with) one another relative to a reference line 1244 oriented perpendicular to the intended direction of tape travel 1206 as shown in FIG. 12. However, according to other embodiments, the number and/or orientation of the write gaps 1204 and/or servo writers 1203 may be different, as will soon become apparent.

Figure 13A:
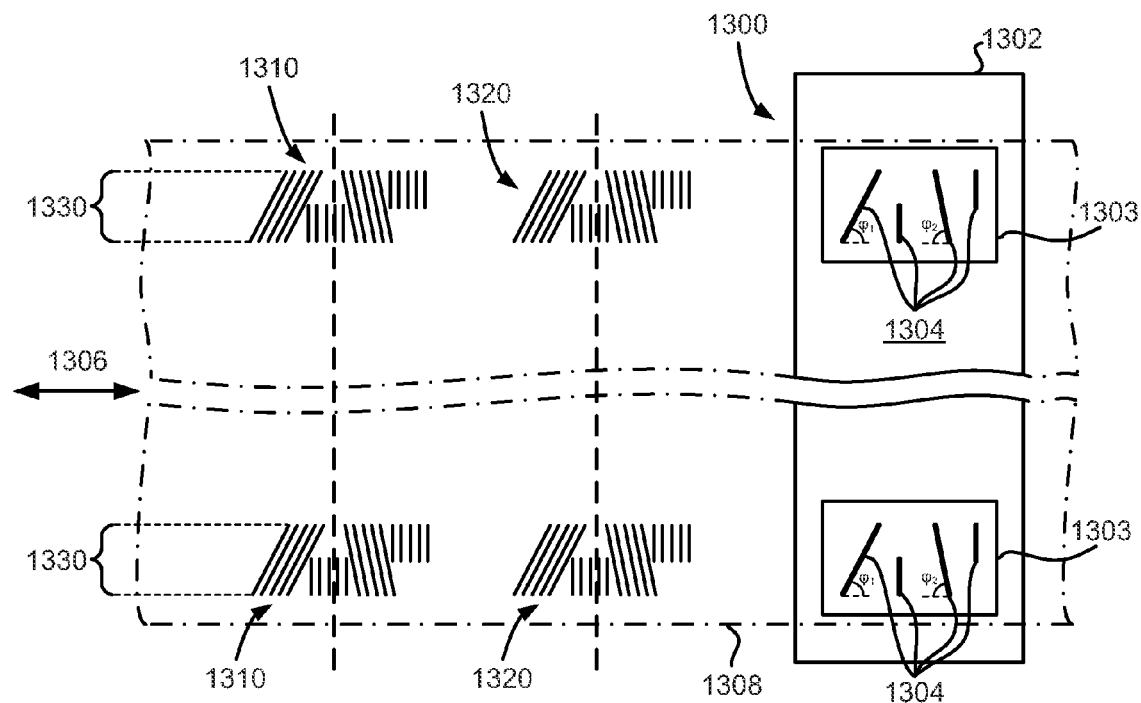
FIG. 13A is a partial media-facing surface view of an apparatus having a magnetic head, according to one embodiment.
Figure 13B:
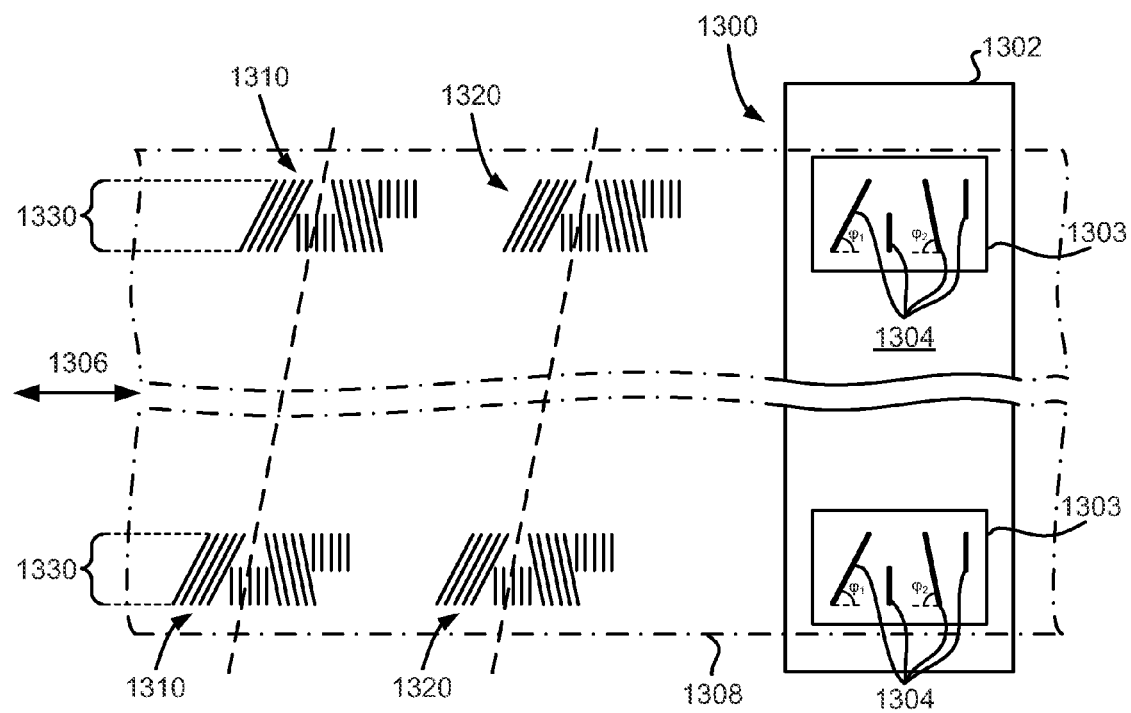
FIG. 13B is a partial media-facing surface view of an apparatus having a magnetic head, according to one embodiment.

FIGS. 13A-13B depict an apparatus 1300 for writing servo tracks, in accordance with another embodiment. As an option, the present apparatus 1300 may be implemented in conjunction with features from any other embodiment listed herein, such as those described with reference to the other FIGS. Of course, however, such apparatus 1300 and others presented herein may be used in various applications and/or in permutations which may or may not be specifically described in the illustrative embodiments listed herein. Further, the apparatus 1300 presented herein may be used in any desired environment. Thus FIGS. 13A-13B (and the other FIGS.) should be deemed to include any and all possible permutations.

As illustrated in FIGS. 13A-13B, the servo writers 1303 may be positioned such that the write gaps 1304 are about aligned in a direction perpendicular to the direction of tape travel 1306. Moreover, the angled write gaps 1304 are oriented at angles $\phi_1$, $\phi_2$, e.g., corresponding to the range of values for the first and third magnetic bars 1012, 1020 illustrated in FIGS. 10B-10D. It should also be noted that the magnetic recording tape 1308 and servo frames 1310, 1320 of FIGS. 13A-13B are not drawn to scale, but rather are illustrated to show the features of the present embodiments.

Looking now to FIG. 13A, according to an exemplary embodiment, each of the servo writers 1303 of the apparatus 1300 may emit a concentrated flux concurrently. Thus the servo writers 1303 may be configured to write at least two servo tracks having a plurality of identical servo frames 1310, 1320, such that corresponding servo frames in each of the servo tracks 1330 are about aligned in a direction perpendicular to a tape travel direction 1306 relative to the magnetic head 1302.

When reading and/or writing data to a magnetic recording tape 1308 having corresponding servo frames about aligned in a direction perpendicular to a tape travel direction 1306 as shown in FIG. 13A, a magnetic recording system with a tilted array of transducers may be programmed to compensate for servo frames positioned as shown in FIG. 13A. According to one embodiment, error correction code may be applied to the data received from servo readers during operation thereof to compensate for the angular difference between the tilted servo readers and the laterally-aligned servo frames.

However, according to another embodiment for writing servo tracks, a controller may be used to delay operation of one or more of the servo writers 1303. In one embodiment, an apparatus may include logic configured to create offset frames in adjacent servo tracks by shifting timing of writing of the servo frames along the longitudinal axis of the magnetic recording tape. Thus, the servo writers 1303 may be independently addressable relative to the other servo writers 1303. Accordingly, such separately-addressable servo writers 1303 may be associated with a different write coil and yoke than the other writer. Moreover, at least one of the write gaps 1304 in each servo writer 1303 may be separately addressable to enable encoding of information into a servo track.

Looking to FIG. 13B, although the servo writers 1303 are shown as being oriented about aligned with each other in the direction perpendicular to the intended direction of tape travel 1306, the timing of operation of the servo writers 1303 may be offset such that corresponding servo frames 1310, 1310 and 1320, 1320 respectively, may have substantially collinear centerlines. According to different embodiments, the offset of the timing of the servo writers 1303 may be dependent on the speed of the tape, the spacing between each servo frame, the number of servo bands in each servo frame, etc.

In another embodiment, once the servo frames have been written to the servo tracks 1330 of the magnetic tape 1308, a trimming operation may be performed. Although not shown in FIGS. 13A-13B, the edges of the magnetic bars written to the magnetic tape may not be aligned with the edges of the servo tracks 1330, but rather may extend past the edges of the servo tracks 1330. This may result from vibration, shifting, skew, etc. of the magnetic tape 1308 and/or apparatus 1300 while writing the magnetic bars to the magnetic tape 1308. Thus, an operation may trim the magnetic bars, preferably such that the tips of the bars are aligned along the edges of the servo tracks 1330 in the intended direction of tape travel 1306, as shown in FIGS. 13A-13B. According to various embodiments, the trimming operation may include any process which would be apparent to one skilled in the art upon reading the present description, such as performing a direct current (DC) erase along each of the edges of the servo tracks. Such trimming may be performed concurrently with writing of the servo tracks, e.g., using a second head; or may be performed thereafter.

Furthermore, any of the embodiments described above may be implemented with previous data and/or tape formats, generations, platforms, etc. Moreover, various embodiments described herein may provide additional information for decoding tape skew within a single module rather than using servo readers on two modules, as conventionally required.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product as comprising:
   a magnetic recording tape having opposite ends, a longitudinal axis of the magnetic recording tape being defined between the ends;
   the magnetic recording tape having at least one servo track,
   the at least one servo track having a plurality of first magnetic bars and a plurality of third magnetic bars oriented to form chevron-like patterns with the first magnetic bars,
   the first magnetic bars each having a longitudinal axis oriented at a first angle between 2 and 88 degrees from the longitudinal axis of the magnetic recording tape,
   the third magnetic bars each having a longitudinal axis oriented at a second angle between 2 and 88 degrees from the longitudinal axis of the magnetic recording tape, the second angle having a different numerical absolute value than the first angle,
   wherein at least first and second ones of the servo tracks are present, wherein a centerline between the first and third magnetic bars of the first servo track is substantially collinear with a centerline between the first and third magnetic bars of the second servo track, the centerlines being at an angle less than 90 degrees from the longitudinal axis of the magnetic recording tape.

2. The product as recited in claim 1, wherein a plurality of the servo tracks are present, wherein sets of the magnetic bars in each servo track are grouped into servo frames, where the servo frames in adjacent tracks are offset from one another relative to a line oriented perpendicular to the longitudinal axis of the magnetic recording tape.

3. The product as recited in claim 1, wherein the at least one servo track includes second magnetic bars, at least one second magnetic bar being positioned between each set of the first and third magnetic bars in a servo frame.

4. The product as recited in claim 3, wherein a width of the at least one servo track is defined in a direction perpendicular to the longitudinal axis of the magnetic recording tape between sides of the servo track, the sides of each servo track extending along ends of the first magnetic bars, wherein lengths of the second magnetic bars along the longitudinal axes thereof is less than the width of the associated servo track.

5. The product as recited in claim 4, wherein the second magnetic bars are positioned away from points of closest approach of the first and third magnetic bars closest thereto.

6. The product as recited in claim 4, wherein the at least one servo track has a plurality of fourth magnetic bars, wherein the fourth magnetic bars are positioned closer to one side of the associated servo track than are the second magnetic bars.

7. The product as recited in claim 4, wherein the lengths of at least some of the second magnetic bars are one half the width of the servo track plus or minus 0.25 to 3 microns.

8. The product as recited in claim 3, wherein the second magnetic bars each have a longitudinal axis oriented substantially 90 degrees from the longitudinal axis of the magnetic recording tape.

9. The product as recited in claim 1, wherein sets of the magnetic bars are grouped into servo frames, wherein a position of at least one of the first and/or third magnetic bars in one of the frames is different than in other frames thereby defining encoded information in the servo track.

10. The product as recited in claim 1, wherein opposite tips of the first and third magnetic bars lie on two straight lines oriented parallel to the longitudinal axis of the magnetic recording tape.

11. An apparatus, comprising:
a magnetic head;
a drive mechanism for passing the magnetic recording tape of claim 1 over the magnetic head; and
a controller electrically coupled to the magnetic head is configured to position the magnetic head based on signals derived from the at least one servo track on the magnetic recording tape.

12. The apparatus as recited in claim 11, wherein an absolute value of an angle between a plane of deposition of a servo reader of the magnetic head and each of the first magnetic bars is nominally the same as an absolute value of an angle between a plane of deposition of the servo reader of the magnetic head and each of the third magnetic bars.

13. An apparatus, comprising:
a magnetic head having at least one servo writer for writing the magnetic bars to the magnetic recording tape of claim 2;
a drive mechanism for passing the magnetic recording tape over the magnetic head; and
a controller electrically coupled to the magnetic head.

14. A method for detecting skew, the method comprising:
reading at least two servo tracks on a magnetic recording tape, the servo tracks each having a plurality of first magnetic bars, at least a plurality of second magnetic bars, and a plurality of third magnetic bars oriented to form chevron-like patterns with the first magnetic bars, the second magnetic bars being positioned between sets of the first and third magnetic bars in a servo frame, the first magnetic bars each having a longitudinal axis oriented a first angle between 2 and 88 degrees from the longitudinal axis of the magnetic recording tape, the third magnetic bars each having a longitudinal axis oriented at a second angle between 2 and 88 degrees from the longitudinal axis of the magnetic recording tape, the second angle having a different numerical absolute value than the first angle, wherein the second magnetic bars each have a longitudinal axis oriented substantially 90 degrees from the longitudinal axis of the magnetic recording tape;
determining a timing offset between detection of the second magnetic bars of the servo tracks; and
calculating a skew based on the timing offset.

15. The method as recited in claim 14, wherein a width of each of the at least two servo tracks is defined between sides of the servo track in a direction perpendicular to the longitudinal axis of the magnetic recording tape, the sides of each servo track extending along ends of the first magnetic bars, wherein lengths of the second magnetic bars along the longitudinal axes thereof are less than the width of the associated servo track.

16. The method as recited in claim 14, wherein a centerline between the first and third magnetic bars of one of the servo tracks is substantially collinear with a centerline between the first and third magnetic bars of another of the servo tracks, the centerlines being at an angle less than 90 degrees from the longitudinal axis of the magnetic recording tape.

17. The method as recited in claim 14, wherein sets of the magnetic bars in each servo track are grouped into servo frames, where the servo frames in adjacent tracks are offset from one another relative to a line oriented perpendicular to the longitudinal axis of the magnetic recording tape.

18. An apparatus, comprising:
a magnetic head;
a drive mechanism for passing a magnetic recording tape over the magnetic head; and
a controller electrically coupled to the magnetic head, the controller being configured to:
receive signals from the magnetic head as it reads at least two servo tracks on a magnetic recording tape, the servo tracks each having a plurality of first magnetic bars, a plurality of second magnetic bars, and a plurality of third magnetic bars oriented to form chevron-like patterns with the first magnetic bars, the second magnetic bars being positioned between sets of the first and third magnetic bars in a servo frame, the first magnetic bars each having a longitudinal axis oriented a first angle between 2 and 88 degrees from the longitudinal axis of the magnetic recording tape, the third magnetic bars each having a longitudinal axis oriented at a second angle between 2 and 88 degrees from the longitudinal axis of the magnetic recording tape, the second angle having a different numerical absolute value than the first angle;
determine a timing offset between detection of the second magnetic bars of the servo tracks; and
calculate a skew based on the timing offset.

19. The apparatus as recited in claim 18, wherein the second magnetic bars each have a longitudinal axis oriented substantially 90 degrees from the longitudinal axis of the magnetic recording tape.

* * * * *